April 20, 1926.  
G. G. WILEY  
RECORDING TRACK SCALE  
Filed Feb. 14, 1924

G. G. WILEY 1,581,769

RECORDING TRACK SCALE

Filed Feb. 14, 1924     27 Sheets-Sheet 8

Fig. 8

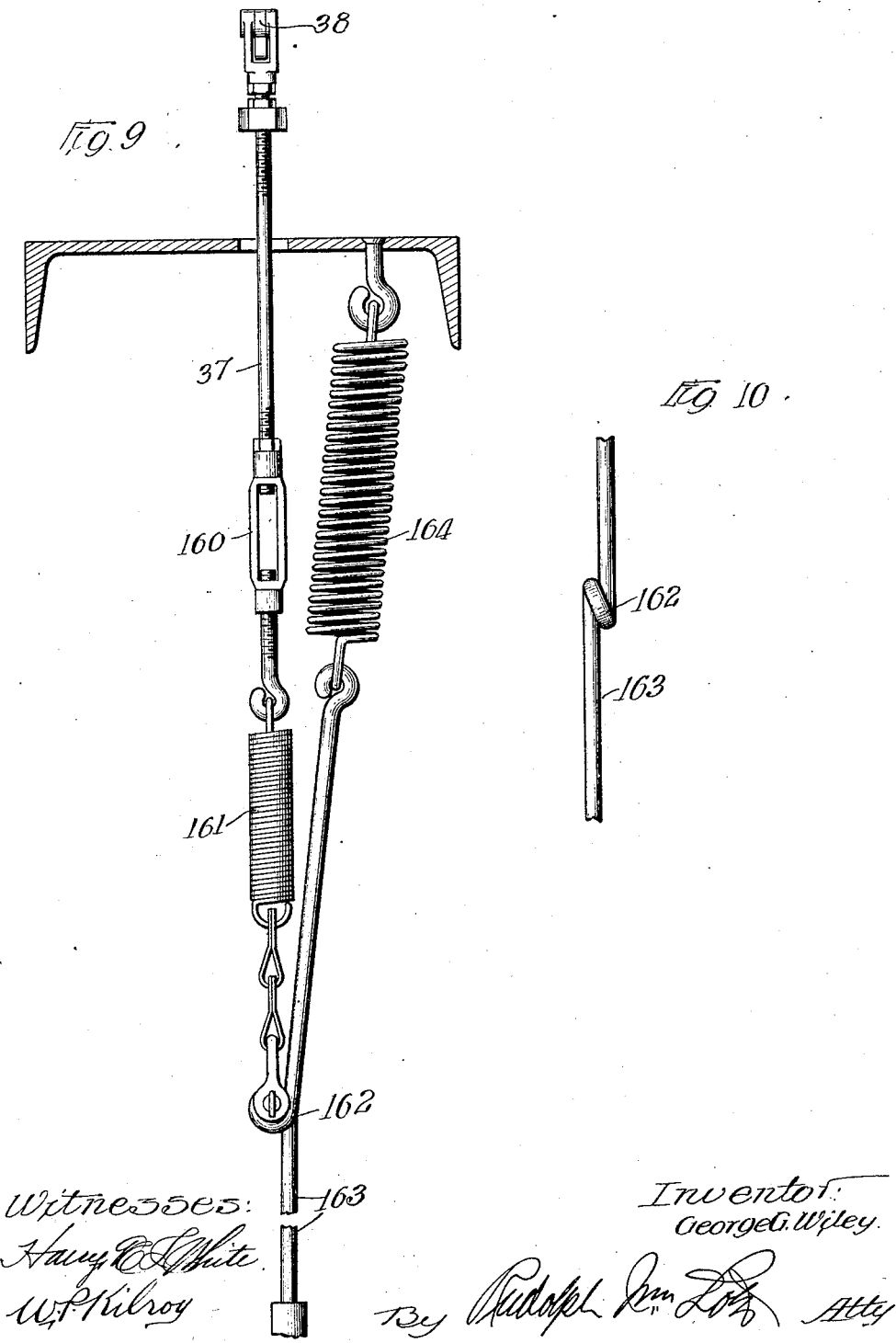

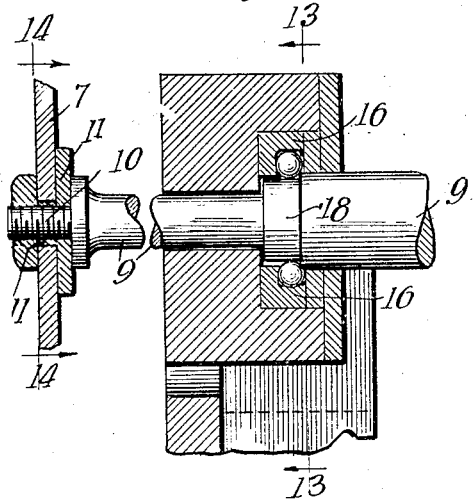
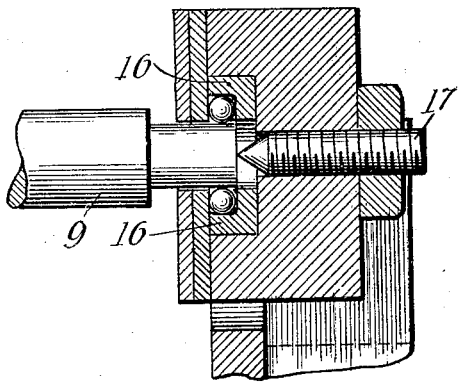
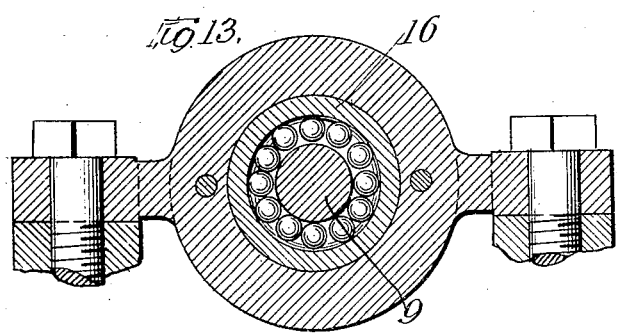
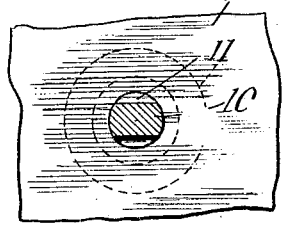
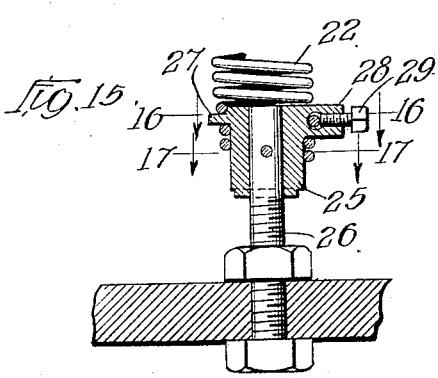
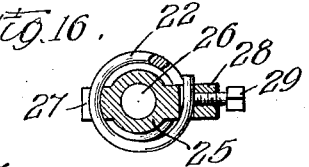
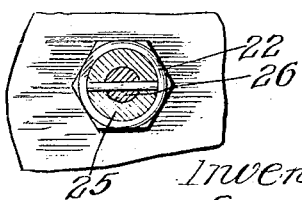

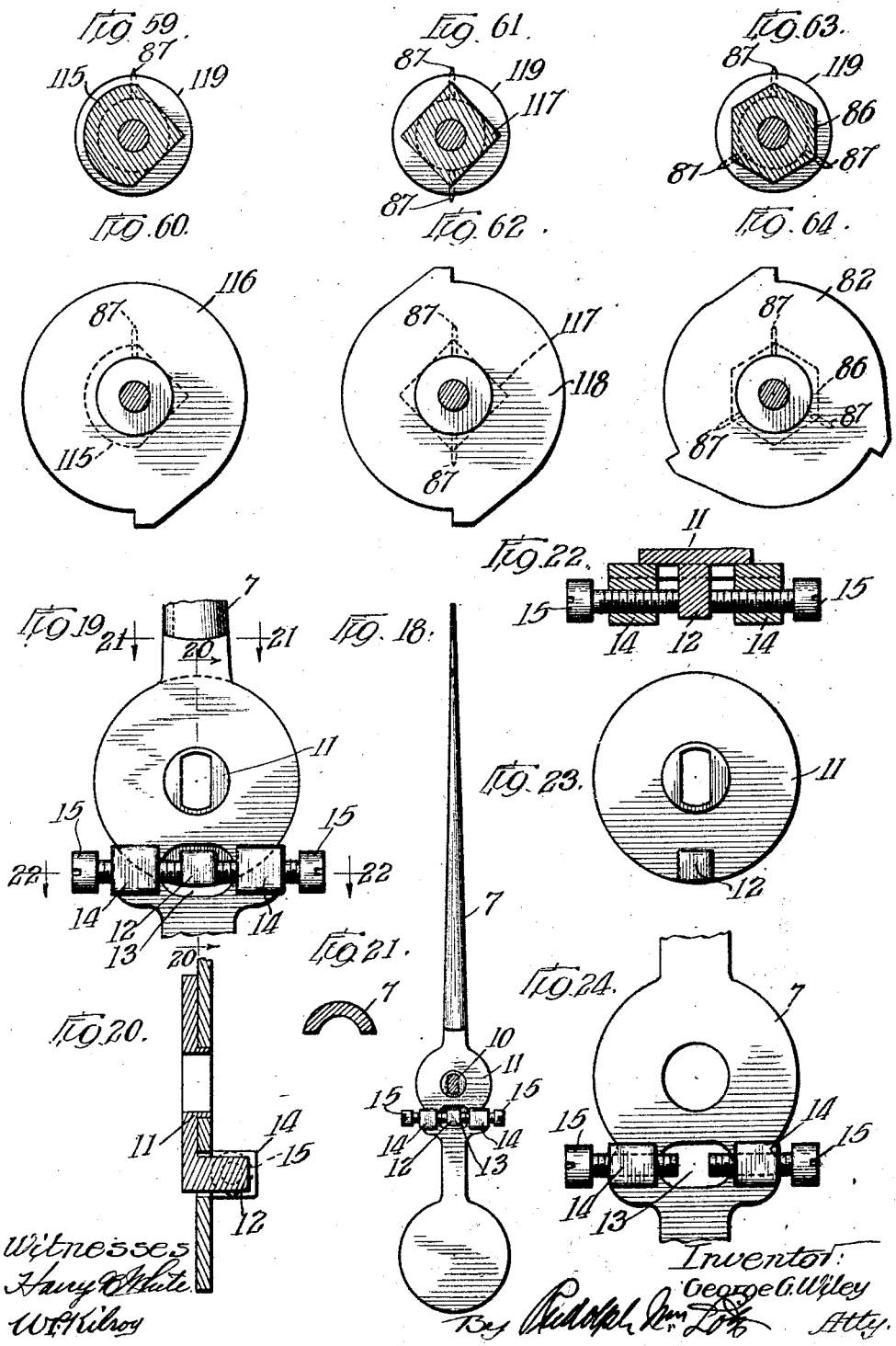

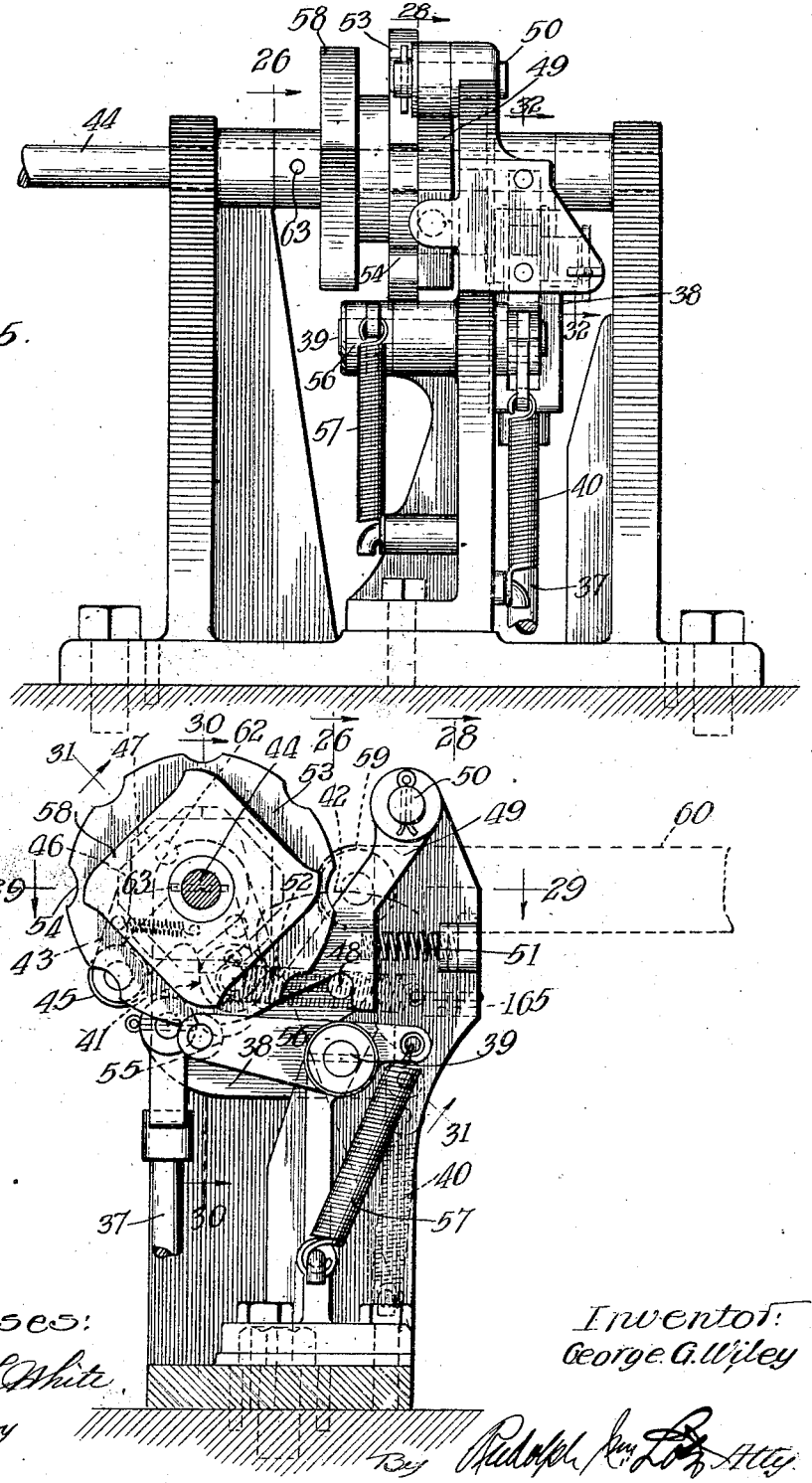

April 20, 1926.
G. G. WILEY
1,581,769
RECORDING TRACK SCALE
Filed Feb. 14, 1924
27 Sheets-Sheet 13
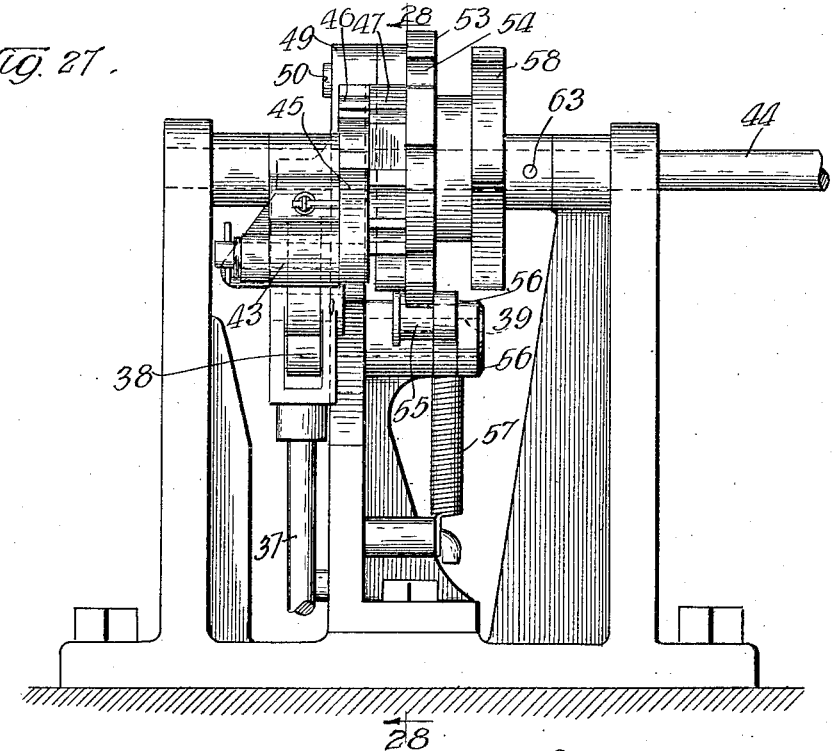
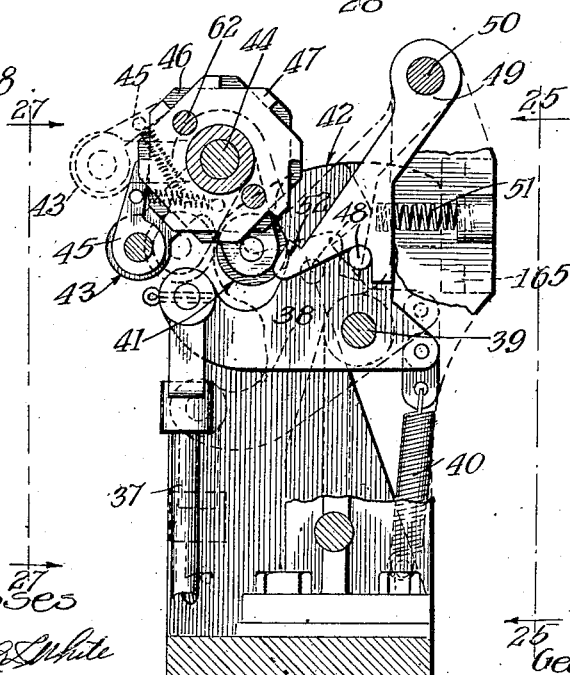

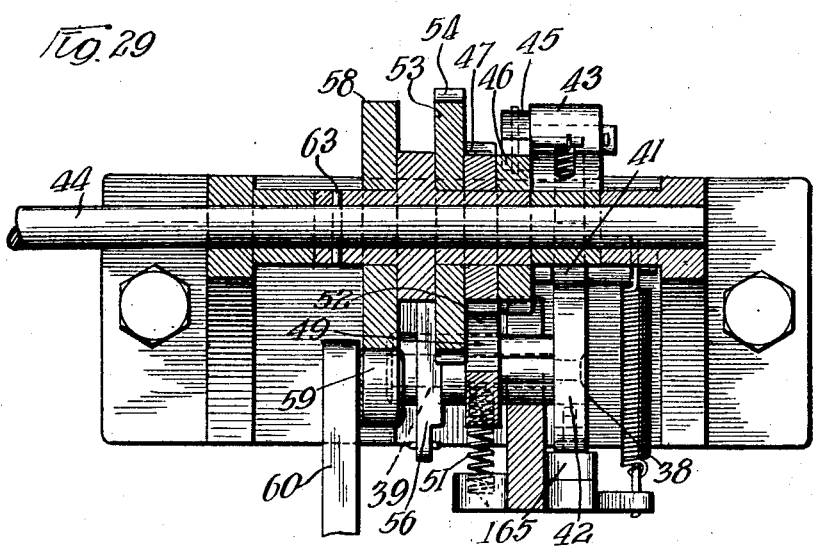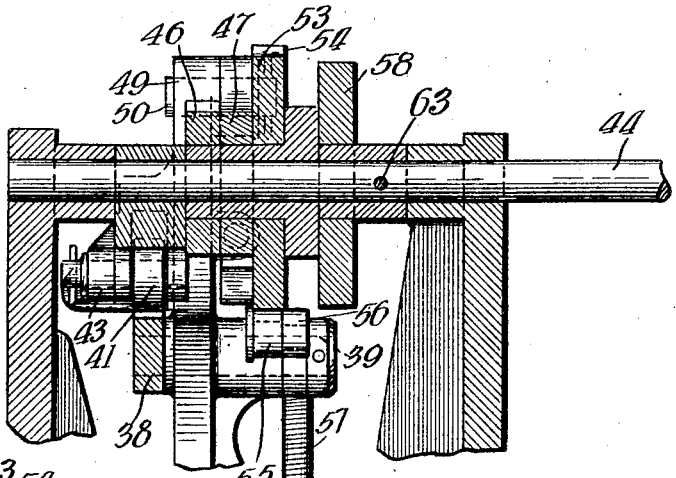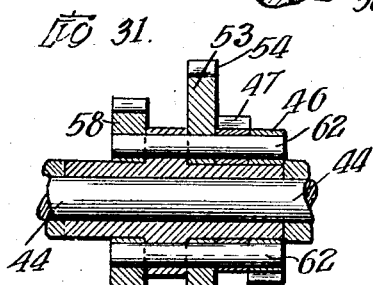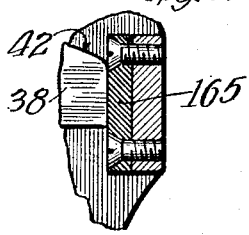

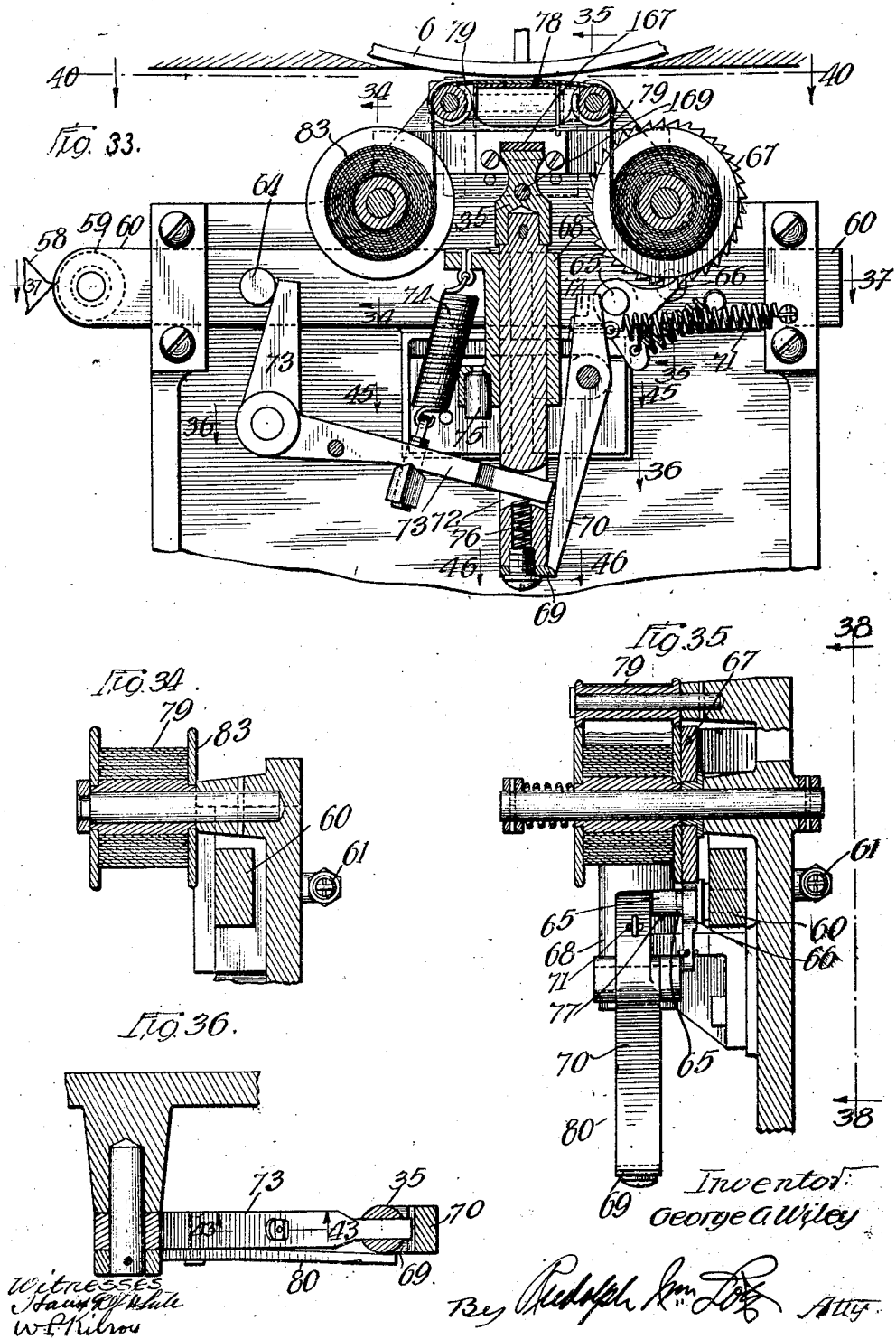

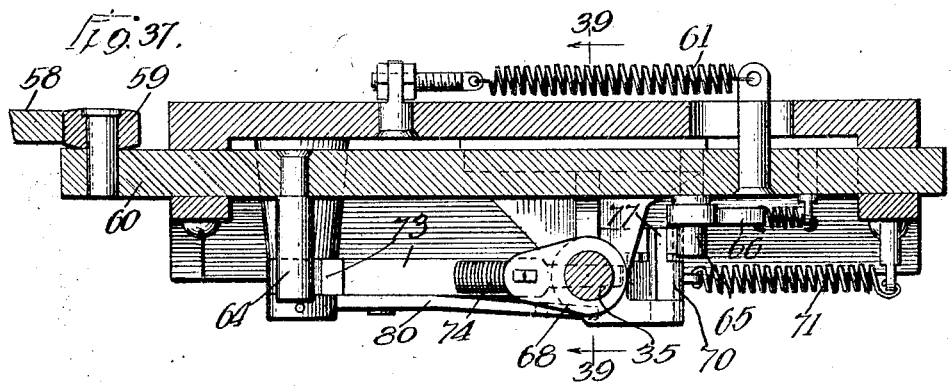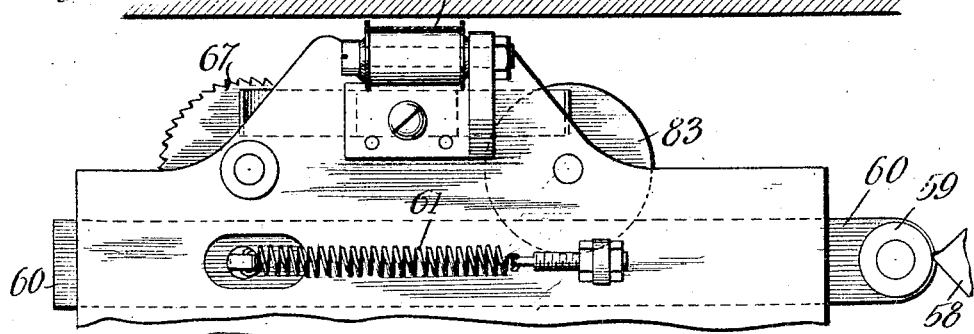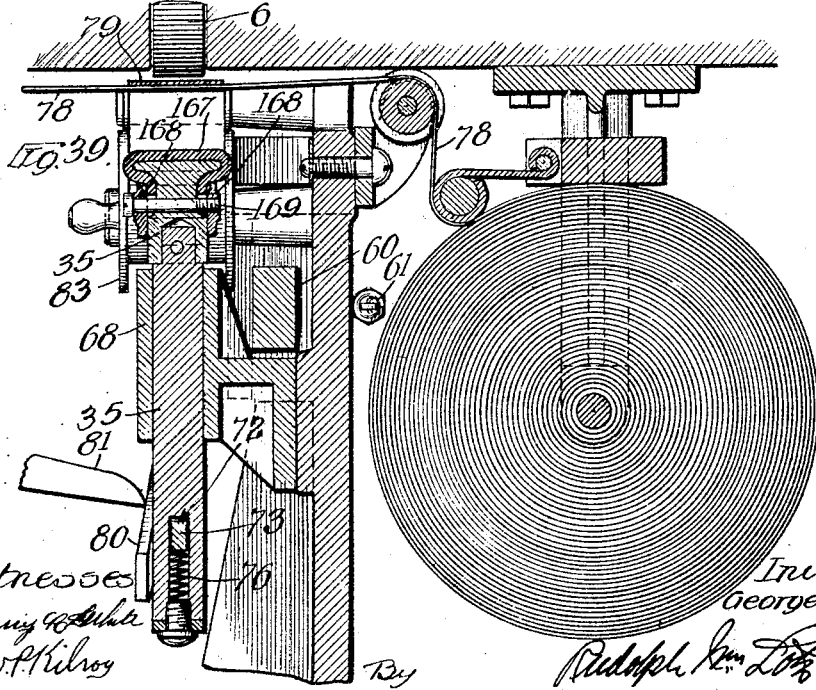

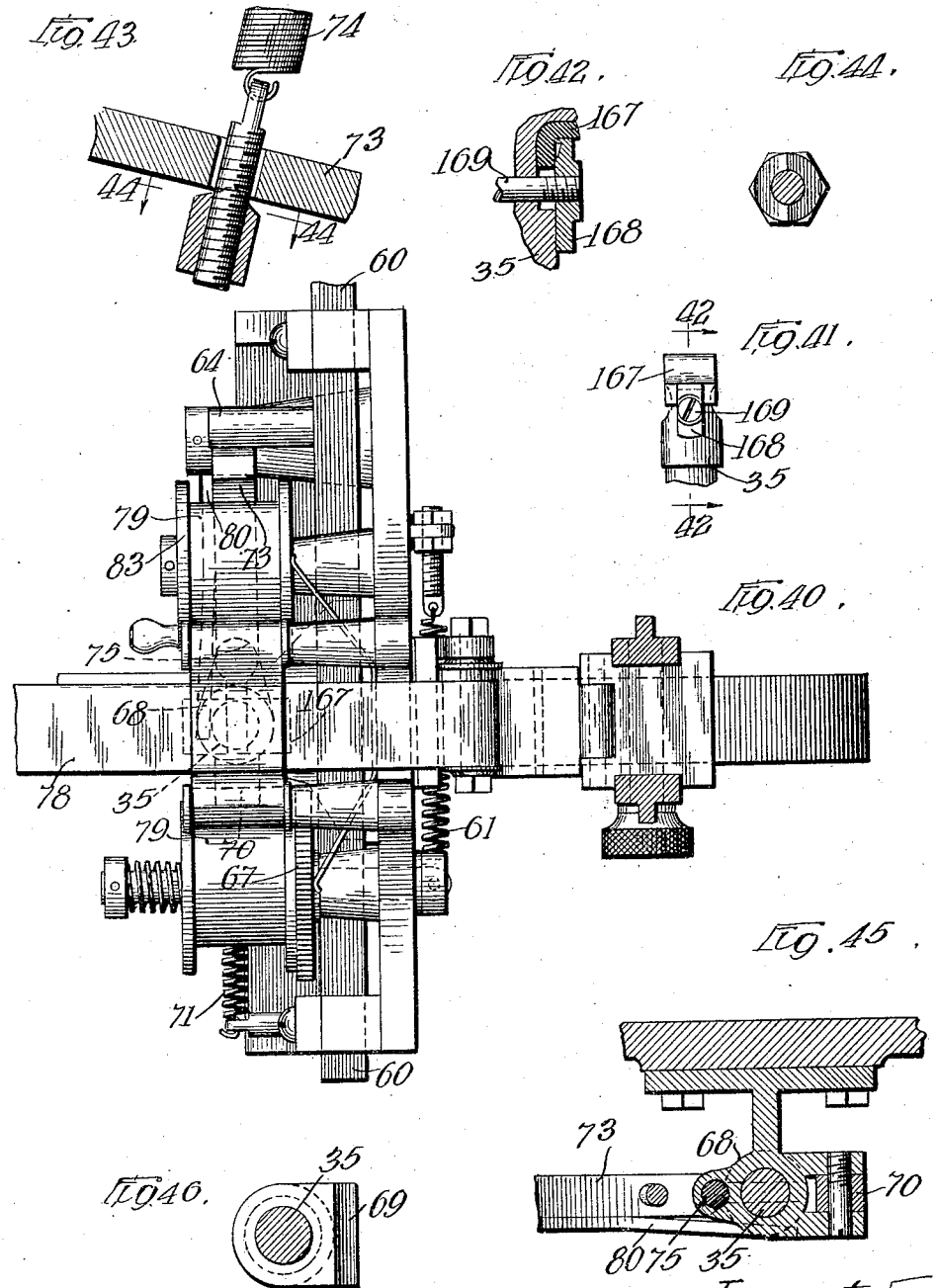

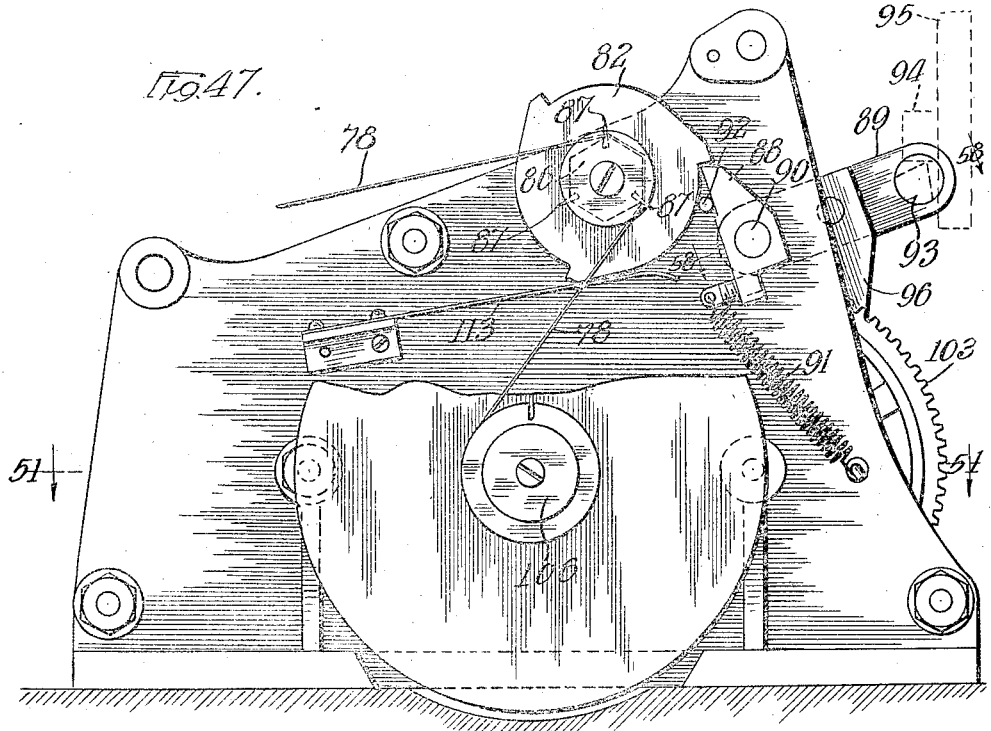
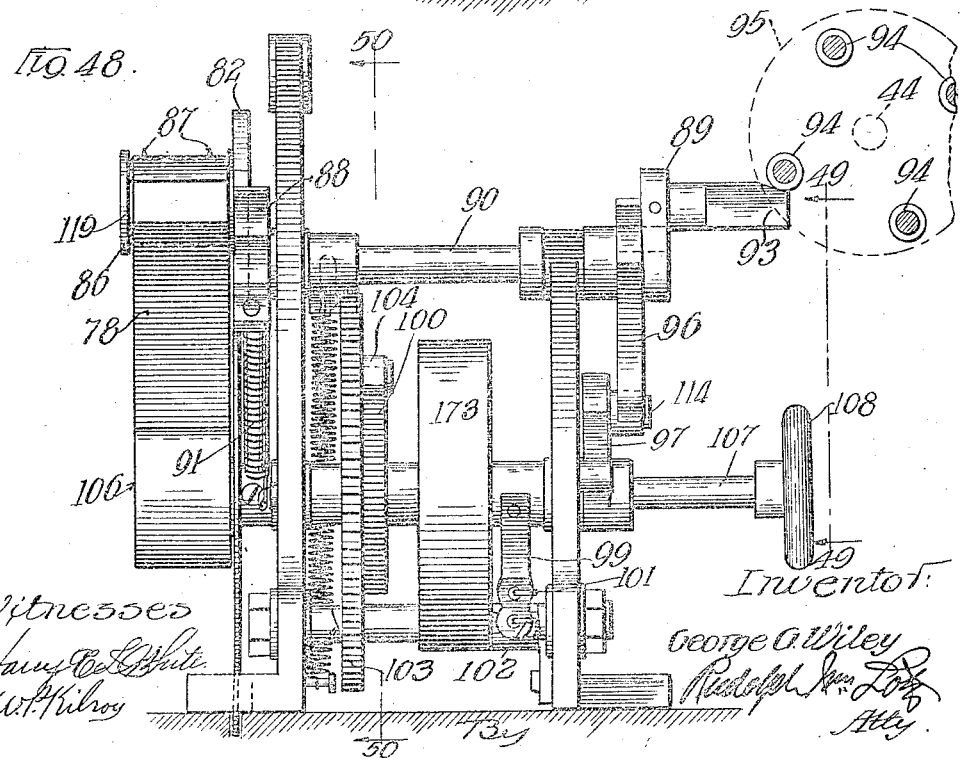

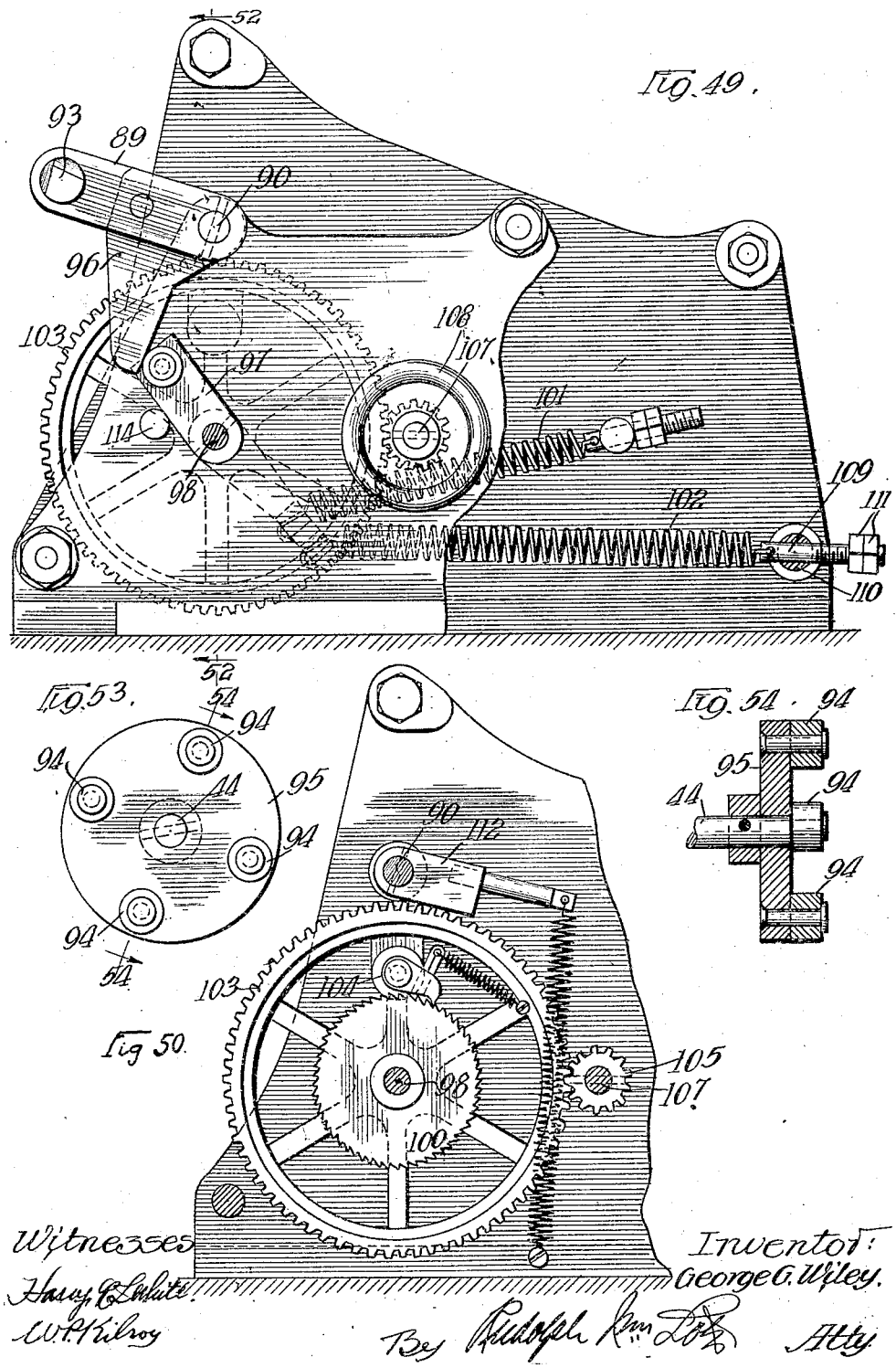

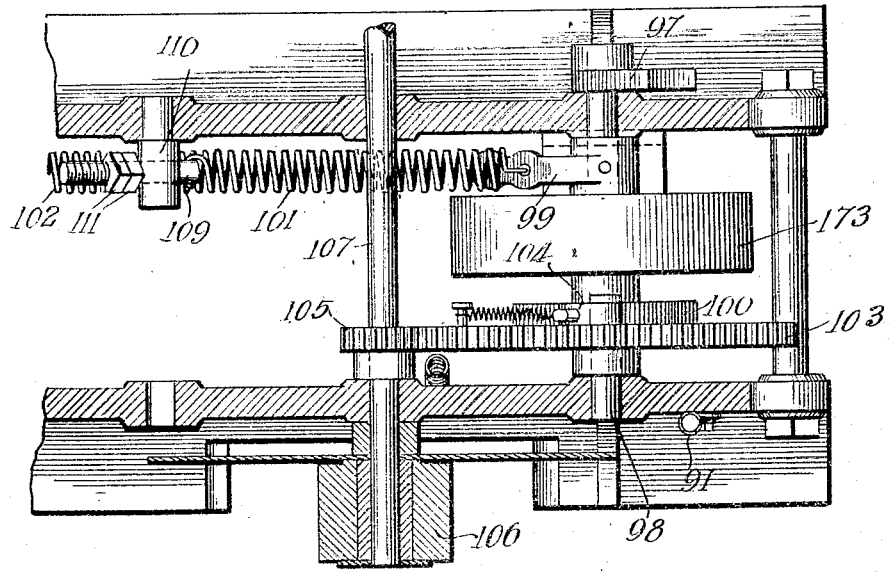

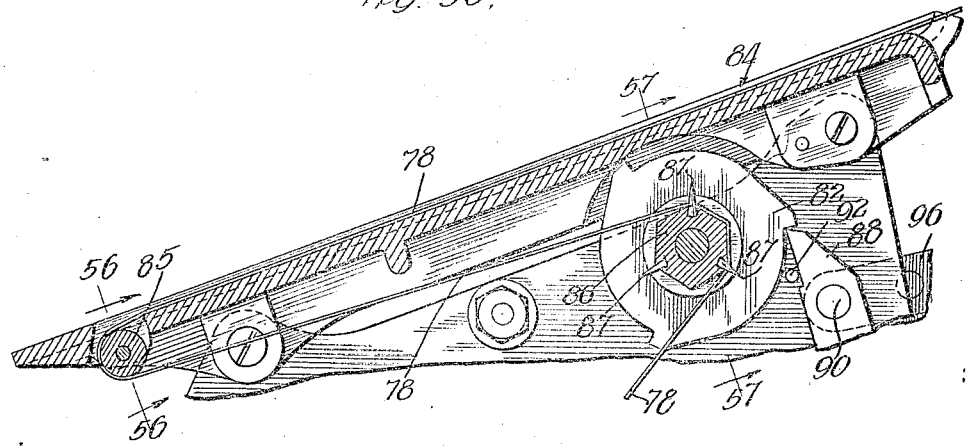
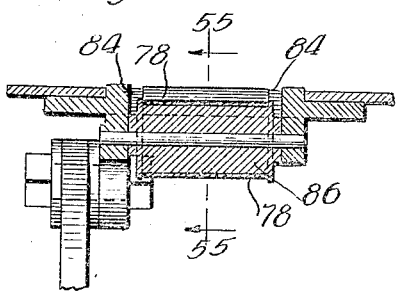
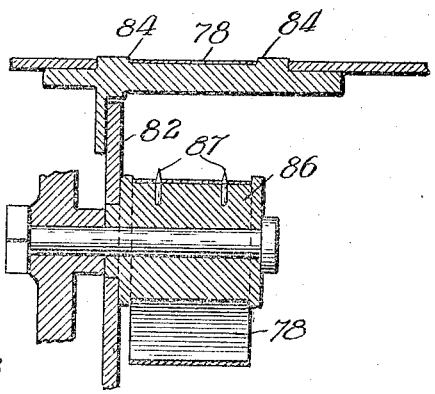
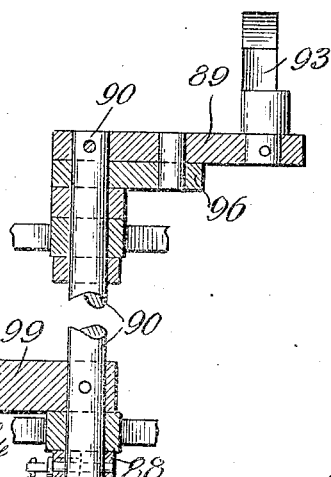

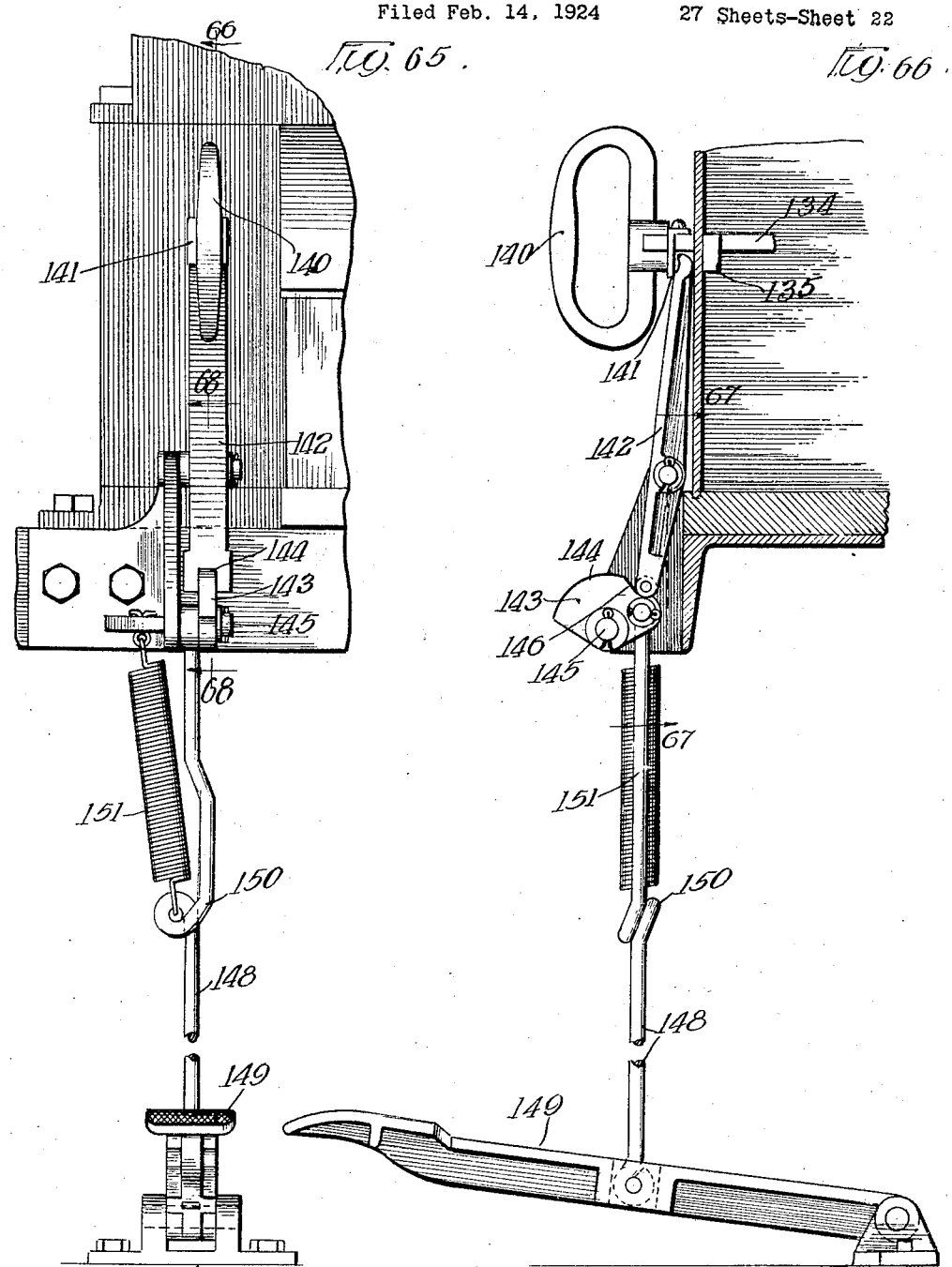

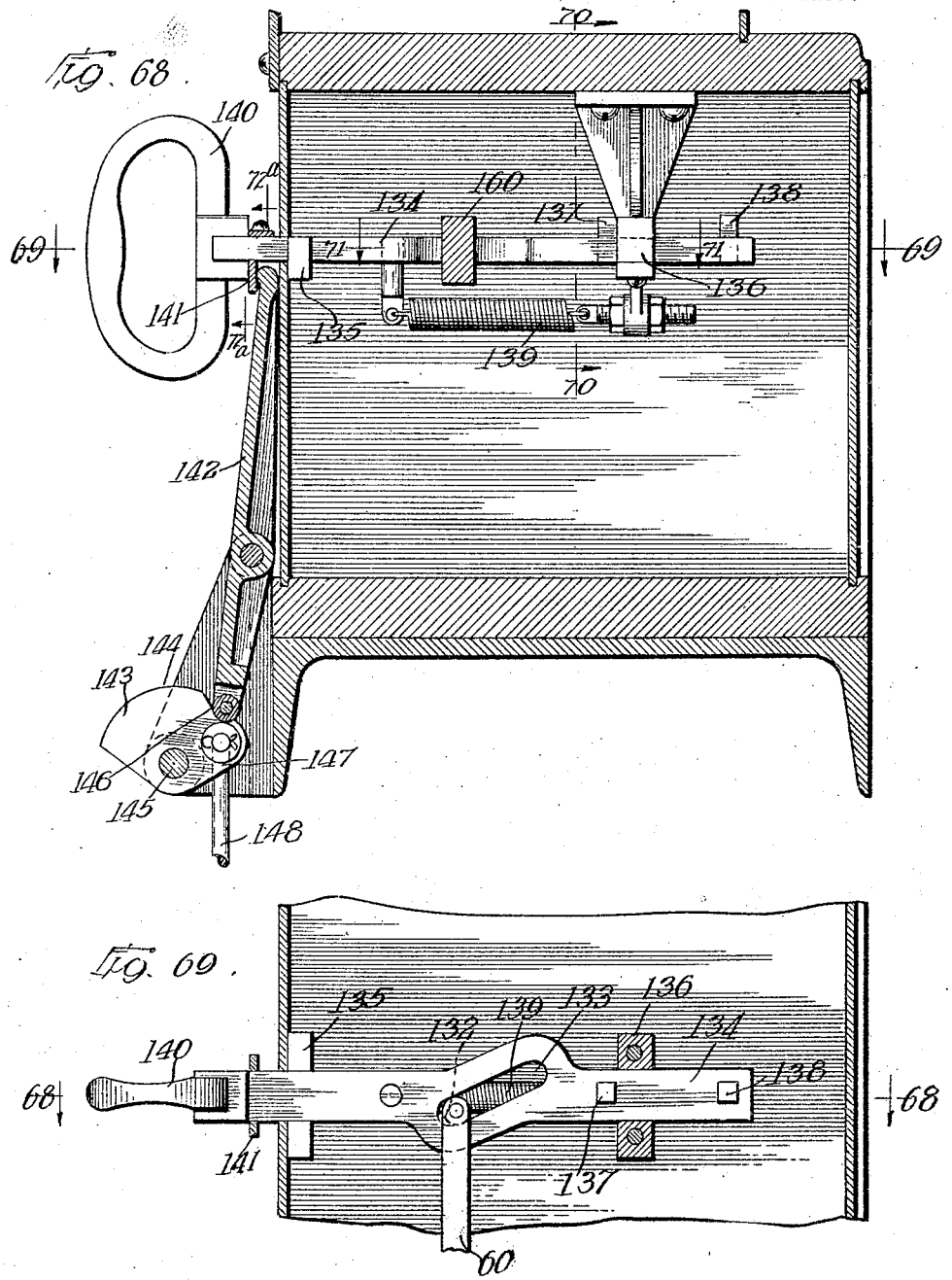

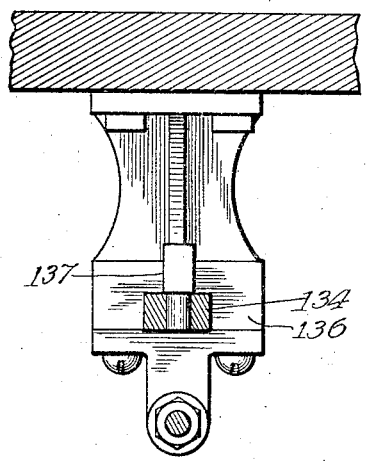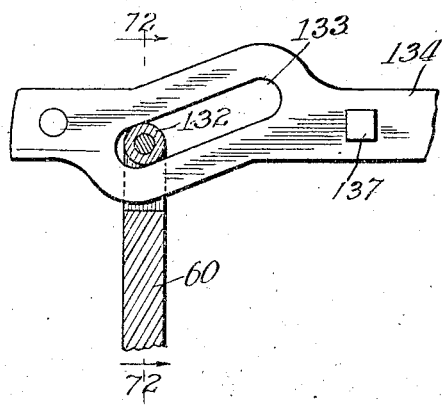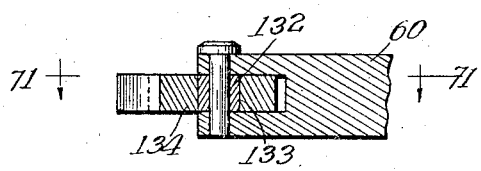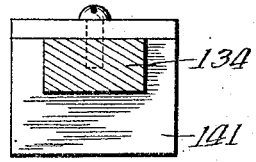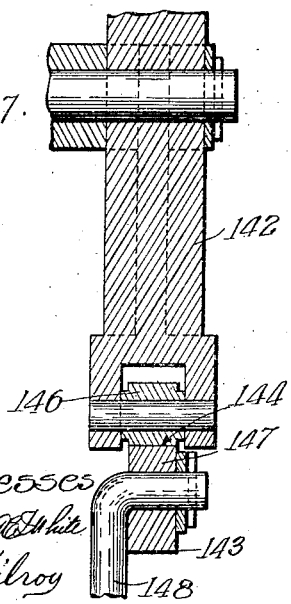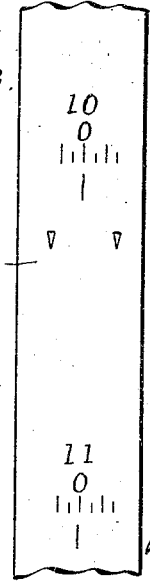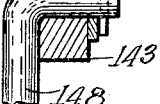

April 20, 1926.
G. G. WILEY
1,581,769
RECORDING TRACK SCALE
Filed Feb. 14, 1924  27 Sheets-Sheet 25
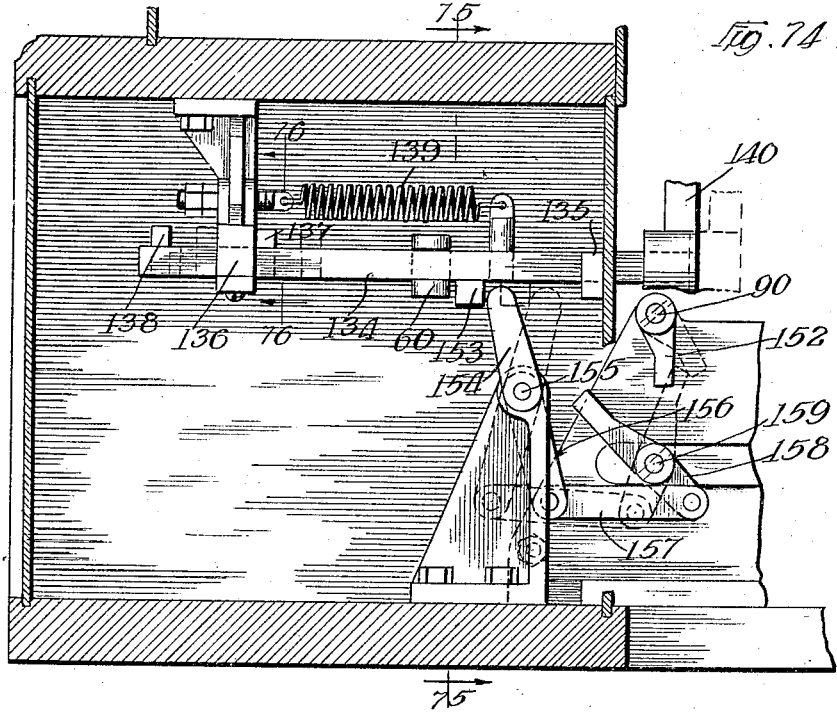
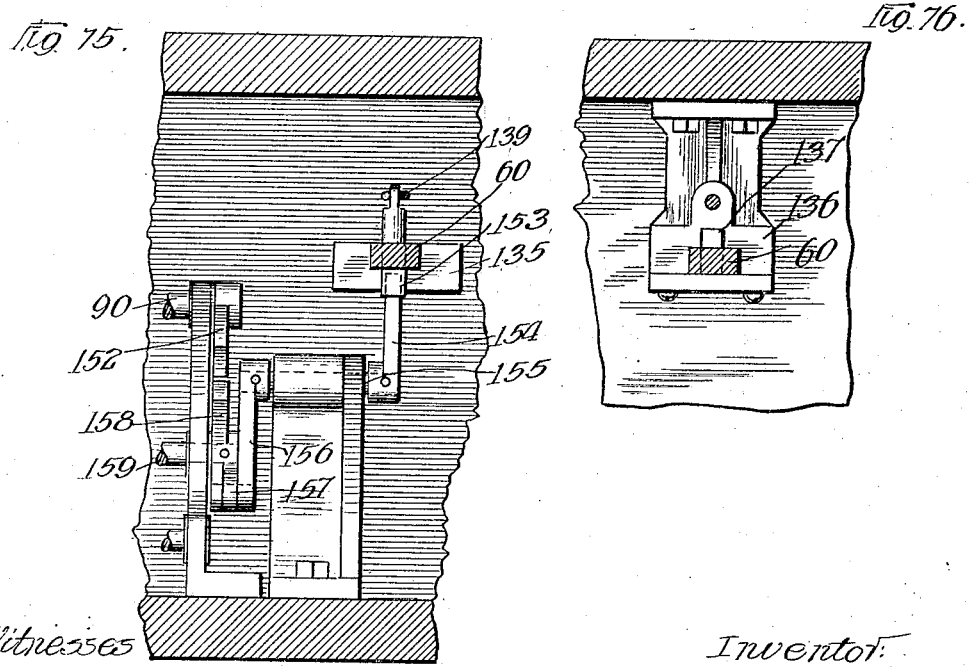
Witnesses
Harry C. L. White
W. F. Kilroy
Inventor:
George G. Wiley
By Rudolph M. Lotz
Atty.

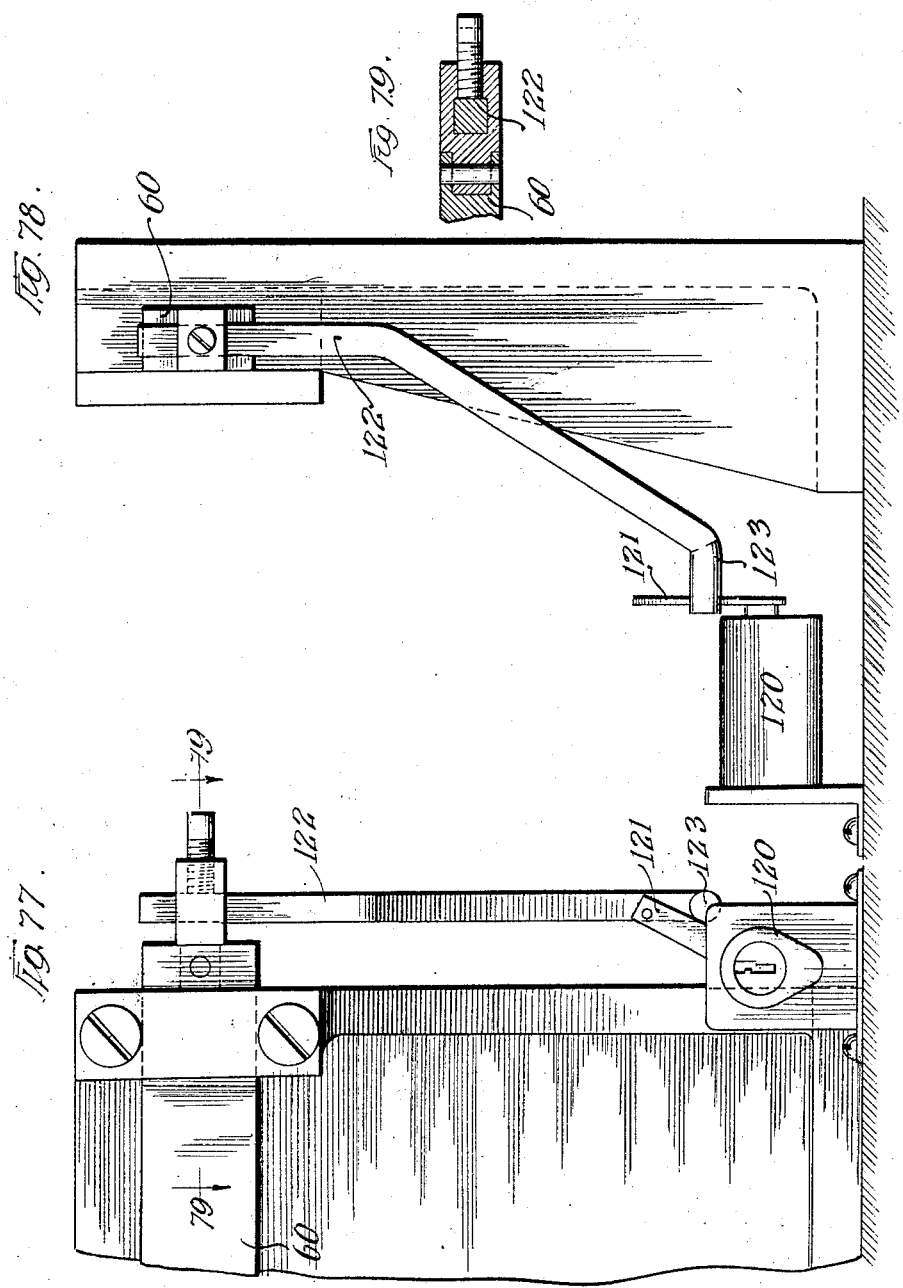

April 20, 1926.
G. G. WILEY
RECORDING TRACK SCALE
Filed Feb. 14, 1924
1,581,769
27 Sheets-Sheet 27
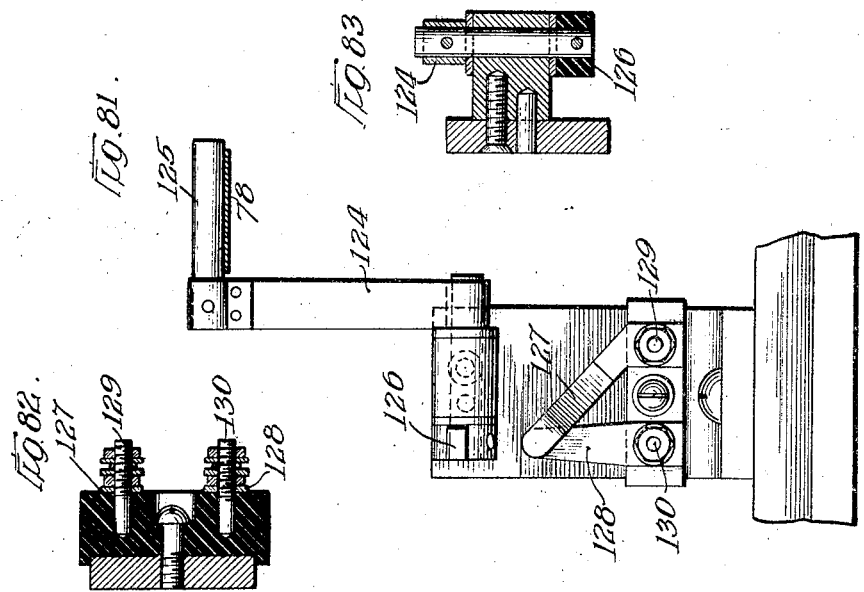
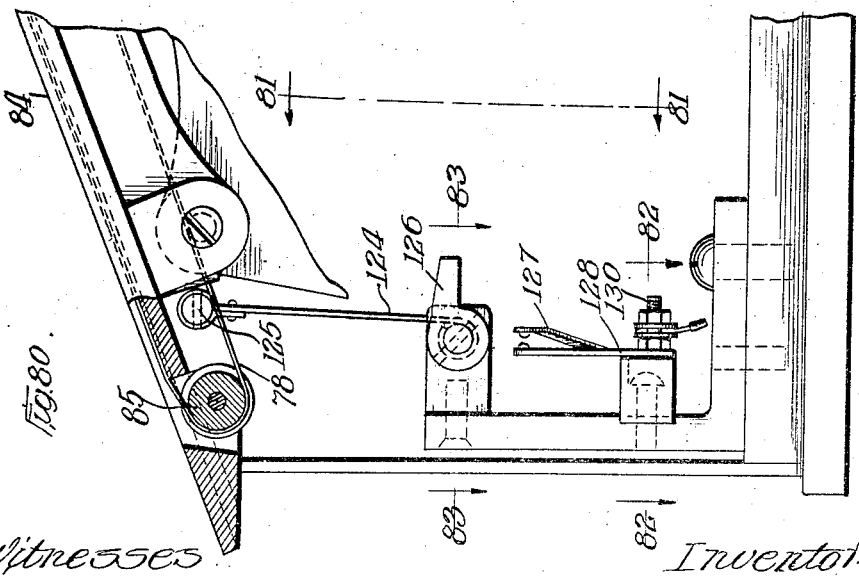

Patented Apr. 20, 1926.

1,581,769

UNITED STATES PATENT OFFICE.

GEORGE G. WILEY, OF CHICAGO, ILLINOIS, ASSIGNOR TO STREETER-AMET WEIGHING & RECORDING COMPANY, OF CHICAGO, ILLINOIS, A CORPORATION OF ILLINOIS.

RECORDING TRACK SCALE.

Application filed February 14, 1924. Serial No. 692,647.

*To all whom it may concern:*

Be it known that I, GEORGE G. WILEY, a citizen of the United States, residing at Chicago, in the county of Cook and State of Illinois, have invented certain new and useful Improvements in Recording Track Scales, of which the following is a specification.

This invention relates to improvements in track-scales for weighing moving cars and automatically recording the weights thereof, including means for substituting manually operable control means for effecting weight records in lieu of a part of the automatic means aforesaid.

The main object of the invention is to provide a scale of the character aforesaid which is relatively simple in construction and operation and is particularly adapted for use at mines or wherever cars of uniform length, substantially equal weight (tare) and having equal numbers of wheels, are employed.

A further object of the invention is to provide a scale of the kind specified which is readily converted into a manually operated non-automatic structure, and is equipped with means for effecting manual operation thereof.

Another object of the invention is to provide means whereby the moving load stores up the energy necessary to feed the record-receiving tape of the scale.

Another object of the invention is to provide means whereby tearing or exhaust of the said tape is automatically reported by means of an alarm device.

Another object of the invention is to provide means whereby the tape-feeding energy is rendered greatest during the initial travel of the tape.

A further object of the invention is to provide means for preventing slack in and jerk upon the tape following each movement thereof.

Another object of the invention is to provide a scale of the type aforesaid which may be easily interchangeably assembled for either automatic operation, including means for effecting manual operation under certain conditions, or for manual operation to the exclusion of automatic operation.

Various other objects of the invention are set forth hereinafter.

The preferred embodiment of the invention is illustrated in the accompanying drawings, in which:

Fig. 8 is a plan section on the line 8—8 of Fig 5.

Fig. 9 is a detail vertical section on the line 9—9 of Fig. 4.

Fig. 10 is a detail elevation of a portion of the rod shown in Fig. 9.

Figure 7:
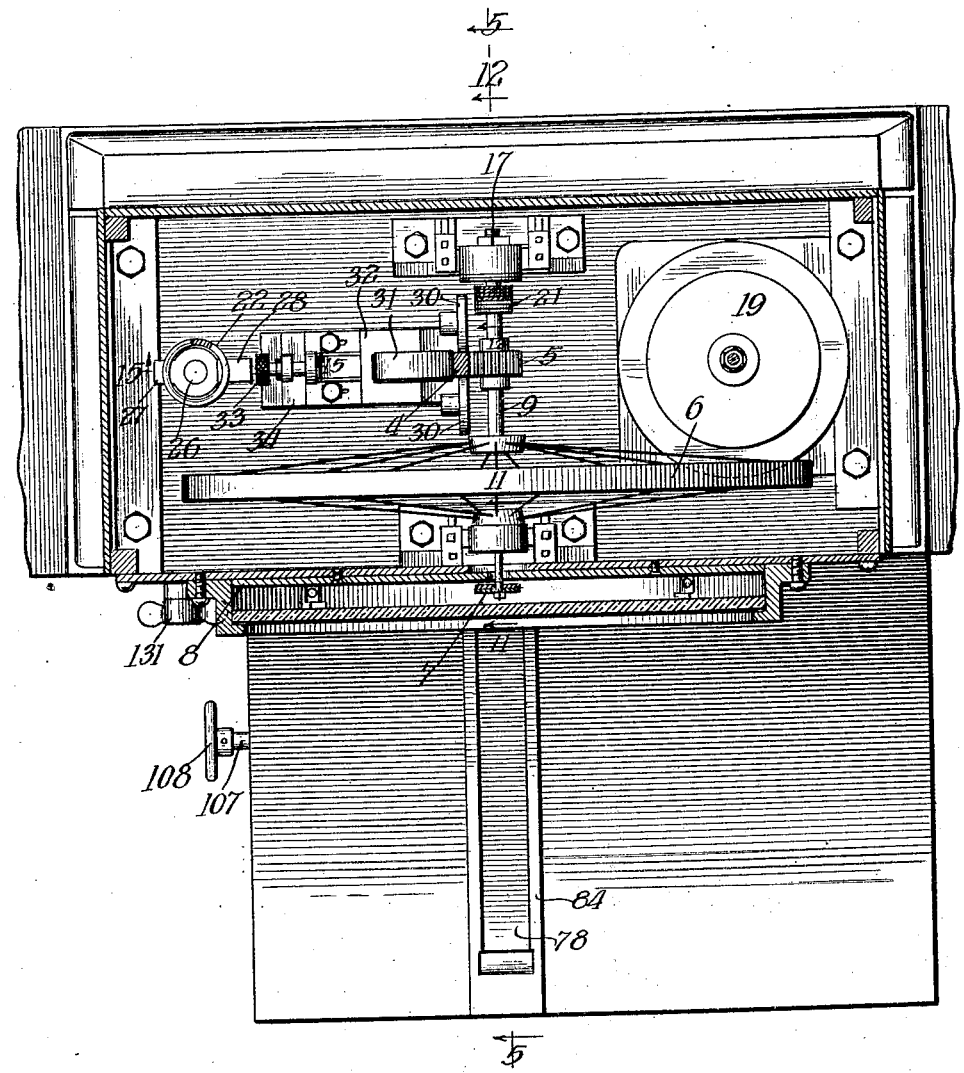
Fig. 7 is a plan section on the line 7—7 of Fig. 5.

Figs. 11 and 12 are detail sections on the lines 11—11 and 12—12 of Fig. 7.

Fig. 13 is a detail section on the line 13—13 of Fig. 11.

Fig. 14 is a detail section on the line 14—14 of Fig. 11.

Fig. 15 is a detail section on the line 15—15 of Fig. 7.

Figs. 16 and 17 are detail sections on the lines 16—16 and 17—17, respectively, of Fig. 15.

Fig. 18 is a view in elevation of the indicating hand for the dial.

Fig. 19 is a similar view of the hub portion of said hand.

Figs. 20 and 21 are detail sections on the lines 20—20 and 21—21, respectively, of Fig. 19.

Fig. 22 is a section on the line 22—22 of Fig. 19.

Fig. 23 is a view in elevation of a disk, and Fig. 24 of the hub-portion of the indicating hand with the disk removed.

Fig. 25 is an end elevation of the portion of the mechanism shown in the upper left corner of Fig. 8 to the left of the line 25—25.

Fig. 26 is a section on the line 26—26 of Figs. 25 and 28.

Fig. 27 is an end elevation of the part of the mechanism to the right of the line 27—27 of Figs. 8 and 28.

Fig. 28 is a section on the line 28—28 of Fig. 25.

Fig. 29 is a section on the line 29—29 of Fig. 26.

Figs. 30 and 31 are sections on the lines 30—30 and 31—31, respectively, of Fig. 26.

Fig. 32 is a section on the line 32—32 of Fig. 25.

Fig. 33 is a section on the line 33—33 of Fig. 8.

Figs. 34, 35 and 36 are sections on the lines 34—34, 35—35 and 36—36, respectively, of Fig. 33.

Fig. 37 is a section on the line 37—37 of Fig. 33.

Fig. 38 is an elevation looking from above, Fig. 37, or to the left of the line 38—38 of Fig. 35.

Fig. 39 is a section on the line 39—39 of Fig. 37.

Fig. 40 is a plan section on the line 40—40 of Fig. 33.

Fig. 41 is a fragmentary view in elevation of the upper end of the printing plunger.

Fig. 42 is a section on the line 42—42 of Fig. 41.

Fig. 43 is a fragmentary detail section on the line 43—43 of Fig. 36.

Fig. 44 is a section on the line 44—44 of Fig. 43.

Figs. 45 and 46 are sections on the lines 45—45 and 46—46, respectively, of Fig. 33.

Fig. 47 is a view in elevation of the tape feeding mechanism.

Fig. 48 is an end view of same looking at the righthand end of Fig. 47.

Fig. 49 is an elevation on the line 49—49 of Fig. 48.

Fig. 50 is a section on the line 50—50 of Fig. 48.

Fig. 51 is a section on the line 51—51 of Fig. 47.

Fig. 52 is a section on the line 52—52 of Fig. 49.

Fig. 53 is a detail view of a disk employed.

Fig. 54 is a section on the line 54—54 of Fig. 53.

Fig. 55 is a section on the line 55—55 (corresponding to line 5—5) of Fig. 7.

Figs. 56 and 57 are sections on the lines 56—56 and 57—57, respectively, of Fig. 55.

Fig. 58 is a section on the line 58—58 of Fig. 47.

Fig. 59 (Sheet 11) is a section and Fig. 60 an elevation showing one form of tape feeding roll and disk therefor.

Figs. 61 and 62 and Figs. 63 and 64, are, respectively, similar pairs of views showing modified forms of construction.

Fig. 65 is a front elevation of hand and foot operating means for the recording mechanism of the scale.

Fig. 66 is a section on the line 66—66 of Fig. 65.

Fig. 67 (Sheet 24) is a section on the line 67—67 of Fig. 66.

Fig. 68 is a section on the line 68—68 of Fig. 65.

Fig. 69 is a section on the line 69—69 of Fig. 68.

Figs. 70 and 71 are detail sections on the lines 70—70 and 71—71, respectively, of Fig. 68.

Fig. 72 is a detail section on the line 72—72 of Fig. 71.

Fig. $72^a$ is a section on the line $72^a$—$72^a$ of Fig. 68.

Fig. 73 is a fragmentary view of a strip of record-receiving tape employed.

Fig. 74 is a view in elevation of a hand-operating mechanism, being a modified form of the mechanism shown on Sheet 19.

Figs. 75 and 76 are sections on the lines 75—75 and 76—76, respectively, of Fig. 74.

Fig. 77 is a view in front elevation of a means for actuating a counter to record the number of weight records made by the scale.

Fig. 78 is a side elevation of the same.

Fig. 79 is a section on the line 79—79 of Fig. 77.

Fig. 80 is a fragmentary detail section on the line 5—5 of Fig. 7, illustrating an electrical alarm device associated with the record receiving tape to give notice of breaking of the latter.

Fig. 81 is an end elevation of the same on the line 81—81 of Fig. 80, the tape being omitted.

Figs 82 and 83 are sections on the lines 82—82 and 83—83, respectively, of Fig. 80.

Fig. 84 is a side elevation of the speed governor for the tape feeding mechanism.

Figure 1:
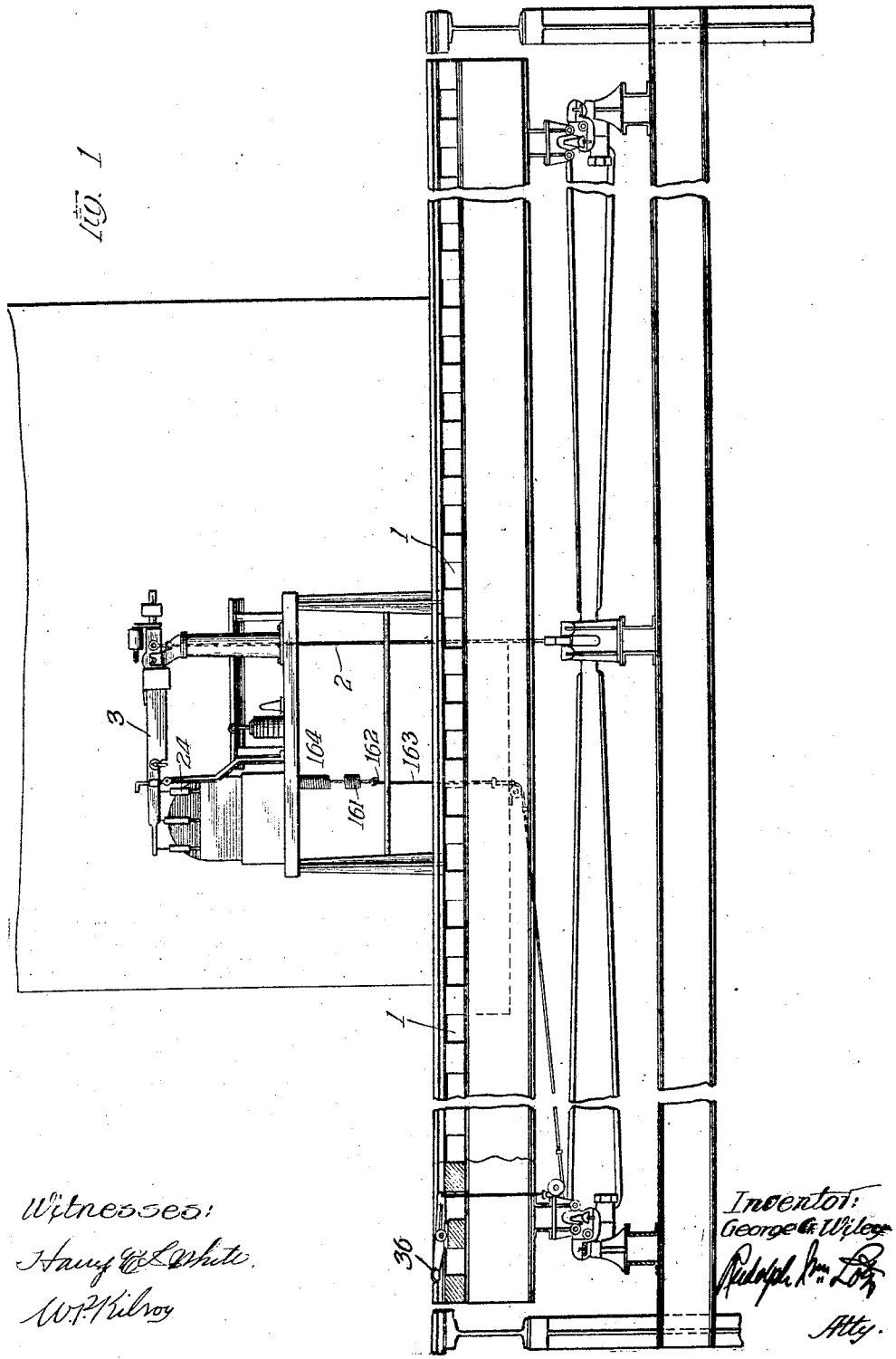
Fig. 1 is a view partly in elevation and partly in vertical section, of a track scale constructed in accordance with the invention.
Figure 2:
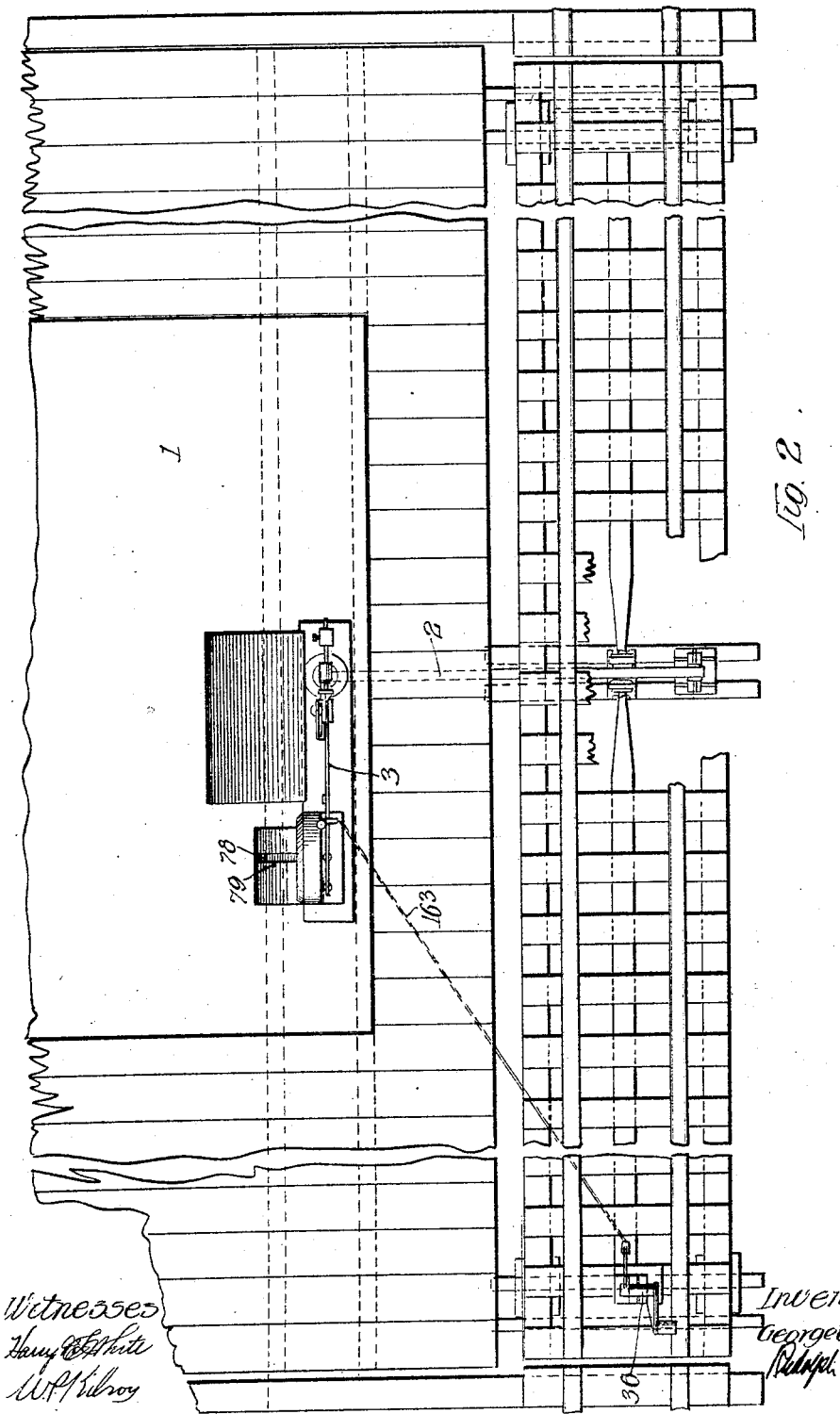
Fig. 2 is a top plan view of the same.
Figure 3:
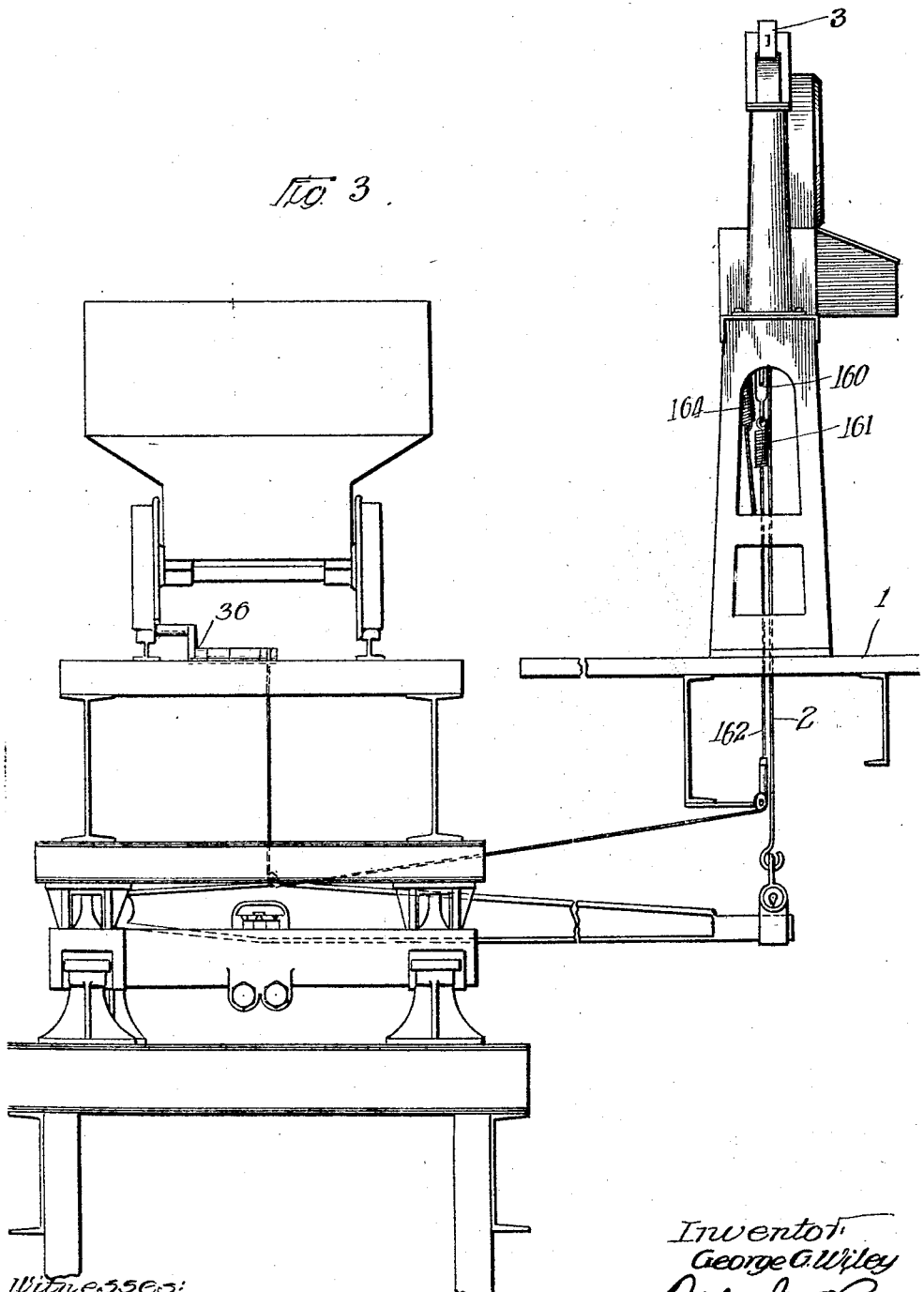
Fig. 3 is an end elevation of the same.
Figure 5:
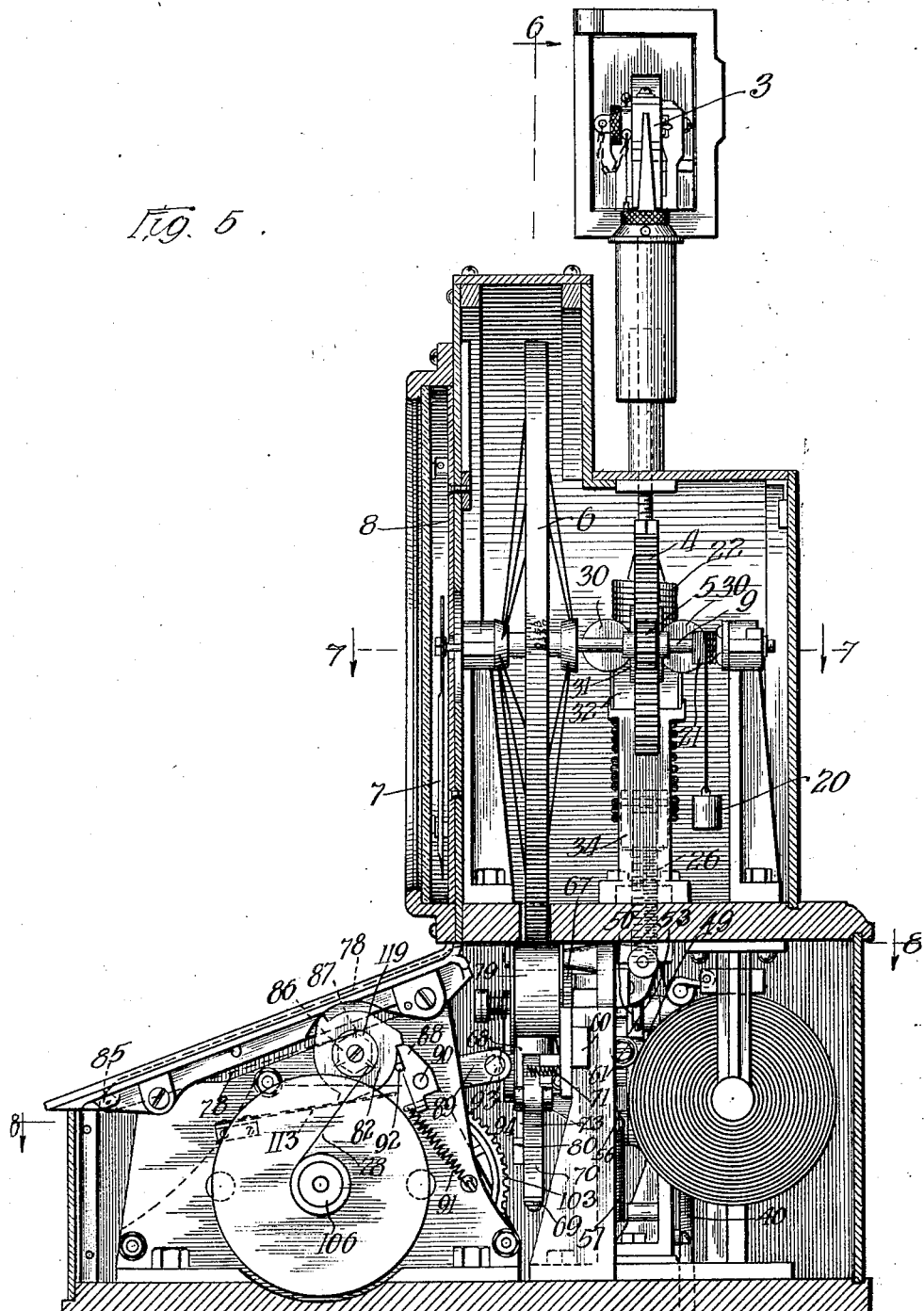
Fig. 5 is a vertical section on the line 5—5 of Fig. 7, showing weight indicating and recording mechanism.

Referring to Fig. 1, the scale platform 1, supported in the usual manner, is operatively connected with the dead-load rod 2 which is connected in turn with the scale-beam 3. The latter (Fig. 5) is associated, by means of the rack-bar 4 meshing with pinion 5, with the printing-wheel 6 and weight indicating hand 7, which indicates on the dial 8, said hand being rigidly associated with the printing wheel 6 against rotation relatively thereto. Adjustment of the rack-bar with reference to the normal position of the scale-beam 3 and printing-wheel 6, to cause the "zero" graduation of the latter to register with the dial 8, is effected by means of inter-engaging threaded elements of well-known construction. The indicating hand is adjustable relatively to the printing-wheel so as to be diametrically aligned with the zero indication thereof, so that when the wheel 6 and hand 7 are thus aligned, the said hand will correctly indicate on the dial 8 the diametrically opposite position of the zero indication of the wheel with reference thereto. The numerals on the rim of the wheel for printing weight-records, are not shown in detail.

The means for effecting adjustment of the hand 7 relatively to the wheel 6, are shown in detail in Figs. 18 to 24 (Sheet 11), the shaft 9 of the wheel 6 being provided at one end with a flat-sided, threaded projection 10 which snugly fits a correspondingly shaped opening in the hub-portion of a disk 11. The latter is provided with a projection 12 which passes through the slot 13 in the hub-portion of the hand 11, said hub-portion having a central opening to receive the hub-portion of the disk 11 on which the hand is rotatable. At each end of the slot 13 is a projection 14 having a threaded opening in which the set-screws 15 engage, the latter bearing upon opposite sides of the projection 12.

The said indicating hand 7 is fully described and claimed in my copending application for patent, filed December 19, 1923, Serial No. 681,537.

Figure 6:
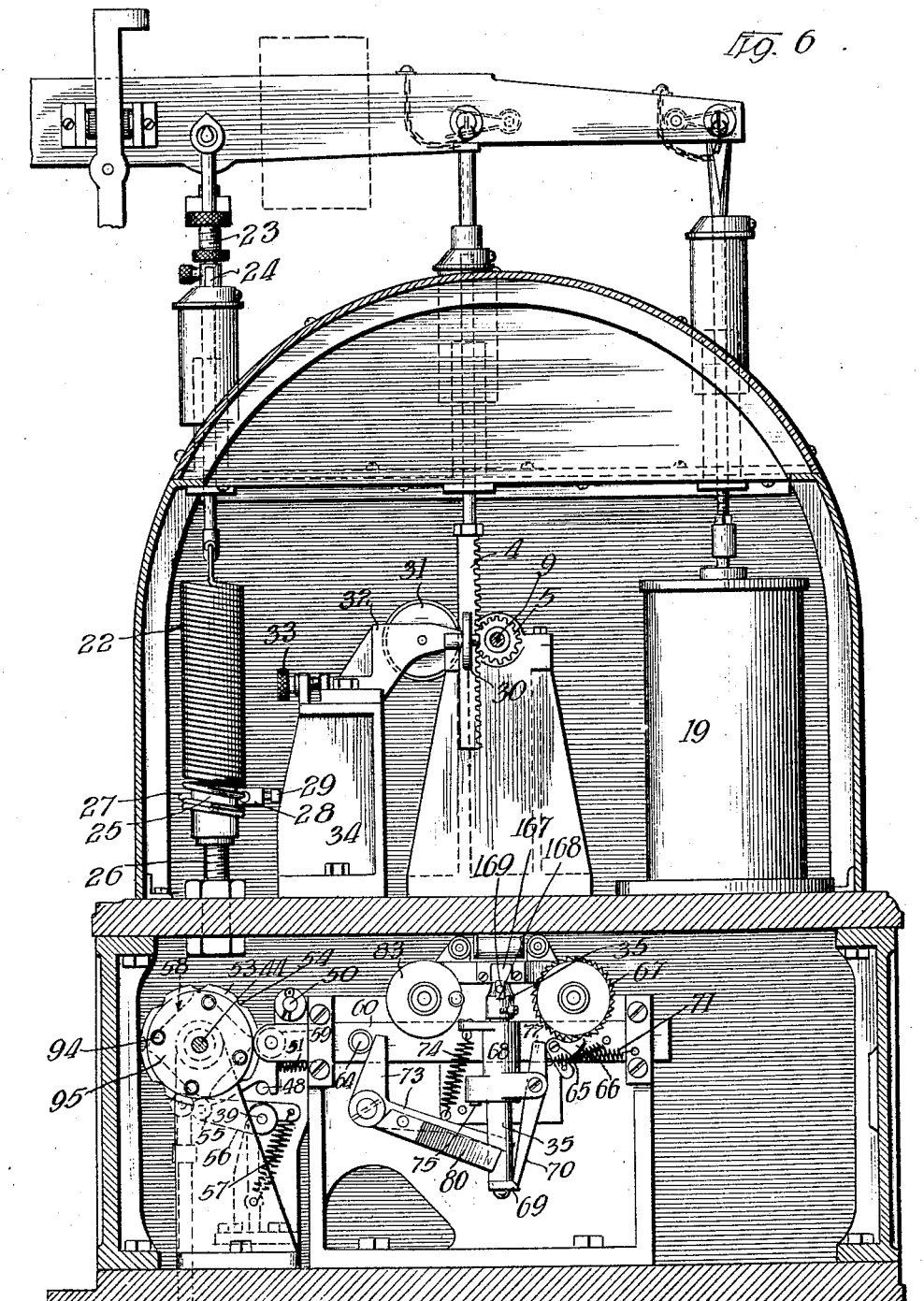
Fig. 6 is a vertical section on the line 6—6 of Fig. 5.

The printing-wheel is rendered as light as possible consistent with necessary strength, and the shaft thereof is journalled in the ball-bearings 16 (Figs. 11 to 13, Sheet 10) and is associated with the thrust-pin 17 at one end for adjusting its position longitudinally with reference to its annular shoulder 18 and the opposed portion of one of the bearing housings. The wheel is thus very easily rotated and readily attains momentum. The latter is checked by the dash-pot 19 (Fig. 6) associated with the scale-beam, which is fully described and claimed in my copending application, Serial No. 681,538, filed Dec. 19, 1923. It is also checked in part, by the counter-weight 20 (Fig. 5) suspended from a cord attached to and wound upon a small drum 21 on the shaft 9.

The scale-beam is further associated with the tension spring 22 (Fig. 6) which serves to maintain it in its normal position against the pull of the dead-load rod. The manner of ascertaining the amount of normal tension to be exerted by said spring, together with details of construction of the scale-beam, is fully described and claimed in my copending application, filed Dec. 19, 1923, Serial No. 681,536.

In order to adjust the normal tension of the spring 22, two elements are employed, one thereof consisting of the inter-engaging threaded elements 23 and 24 included in the connection between the upper end of the spring 22 and the scale-beam, and the other thereof comprising a means for adjusting the active length of said spring, said means being illustrated in detail in Figs. 15, 16 and 17 (Sheet 10). They include the cylindrical block 25 rigidly mounted on a threaded rod or bolt 26 having a stop nut and constituting the anchor element for said spring, said block 25 being provided with a short helical flange 27 and a diametrically oppositely disposed projection 28 provided with an opening through which a free end of the spring is threaded, there being a transverse threaded opening in said projection for the set-screw 29 which engages the spring to firmly hold it, the active portion of said spring being that which is above said flange 27 and the opening in said projection 28.

The specific means (Fig. 6) for maintaining the rack-bar 4 properly in mesh with pinion 5, consisting of the idle-rolls 30 engaging the side faces of said rack-bar to prevent the lateral slippage thereof, and the roller 31 bearing upon the rear face thereof, and which is revolubly mounted in the slidable carriage 32 operatively associated with the adjusting screw 33 and guide elements of the support 34, also constitutes a feature of the invention.

From the foregoing it will be evident that when a load is imposed on the scale-platform 1, the weight of said load will be indicated on the dial by the hand 7 after said load has been on the said platform a sufficient length of time to let the printing-wheel 6 come to rest. At this time the numeral on the face of the wheel corresponding to weight indicated on the dial by the hand 7, will be opposed to the printing plunger 35 of the printing mechanism, the latter being fully described and claimed in my copending application, filed Dec. 19, 1923, Serial No. 681,540, including means for feeding the record receiving tape, the present invention including, broadly, any suitable mechanism for accomplishing this operation.

This mechanism is operated by the track-lever 36 (Fig. 1) pivotally associated with one of the rails on the scale-platform for actuation by the flanges of the wheels of the cars traveling over said platform, such operation of the printing mechanism being accomplished through the agency of the particular mechanism associated with said track-lever 36. The latter is disposed adjacent the discharge end of the platform 1, it being obvious that the length of the latter and the speed of travel of the car must be relatively proportioned to provide for the time interval necessary to permit the printing-wheel to come to rest between the moment the car passes upon the platform and the moment of its actuation of the track-lever. The latter is suitably connected with the vertically reciprocable plunger-rod 37 (Figs. 6 and 25 to 30 inclusive).

The latter is pivotally connected with one arm of a rocking-cam 38 (Fig. 28) pivoted on a stud-shaft 39 and associated with a tension-spring 40 for normally holding same in its normal position with the plunger rod 37 disposed at the upper limit of its movement. The active cam-surface of said cam lies between the point of its engagement with the roller 41 (Fig. 28) and the upper arcuate surface 42 thereof, the latter being concentric with the shaft 39.

The roller 41 is rotatably mounted in the end of one arm of the inverted V-shaped rocker 43, pivotally mounted on the shaft 44. The other arm of said rocker 43 carries the spring-held dog 45 which engages the ratchet-wheel 46 rigid with said shaft 44 and with a similar oppositely disposed ratchet-wheel 47, each of said ratchets having eight teeth. The active cam-surface of the rocking-cam 38 impacts movement to the rocker 43 through an arc of forty-five degrees, the further swing of said cam causing the roller 41 to ride on the arcuate surface 42 without further moving said rocker. A pin 48 on the cam 38 engaging in a recess in the lower end of a stop-dog 49 pivoted on a stud-shaft 50, and normally held by the push-spring 51 to maintain the tooth 52 in the path of a tooth of the stop-ratchet 47, normally holds said dog 49 in the full-line position of Fig. 28 and permits the same to be moved by the spring 51 into engagement with the ratchet 47 as said cam is rocked to cause the dog 45 to rotate the ratchet 46, said tooth 52 attaining its stop-position after the dog 45 has effected a partial rotation of said ratchet 46.

Rigid with the ratchets 46 and 47 is a disk 53 (Fig. 26) having eight peripheral recesses 54 in which the roller 55 at one end of a lever 56 engages, said lever being held by the tension-spring 57 to maintain said roller 55 always in engagement with said disk, said recesses 54 and roller 55 being so disposed relatively to said ratchets 46 and 47 as to be inter-engaged after completion of each one-eighth revolution of said ratchets and serving to hold them firmly in position between intervals of movement.

There is also rigid with said ratchets 46 and 47 a substantially square cam 58 against which the roller 59 at the end of a reciprocable plunger 60 is normally caused to bear by means of a tension spring 61 (Figs. 37 and 38), said plunger 60 constituting a part of the printing mechanism.

The ratchets 46, 47, disk 53 and cam 58 are associated with each other against relative rotation by means of the key-pins 62 and are all thus held against rotation relatively to the shaft 44 by means of the single key-pin 63.

In view of the fact that the printing mechanism is fully described and claimed in a copending application above-mentioned, it will be very briefly described herein, reference being had to Figs. 33 to 46 inclusive.

The plunger 60 is mounted in suitable guides and is provided between its ends with pins 64 and 65, the latter carrying the pivoted spring-held dog 66 for engaging the ribbon feed-roll ratchet 67. The printing plunger 35 is vertically reciprocable in guides 68 and is provided at its lower end with a projection 69 normally engaged by the trip-lever 70 held by the spring 71. It is also provided between its ends with a slot 72 through which the end of one arm of a bell-crank lever 73 passes, the other arm of said lever normally bearing against the pin 64. Said lever is engaged by the tension-spring 74 which is adapted to throw it against the stop 75. In the bottom of the plunger is a central bore containing a compression spring 76 bearing upon the lower face of the arm of the bell-crank lever 73 engaging in the slot 72. The upper end of trip lever carries a projection 77 disposed in the path of pin 65.

The tape 78 travels transversely of the type-writer ribbon 79 and below the latter, both in the path of the plunger 35.

As the cam 58 rotates through an arc of forty-five degrees, the plunger 60 carries the pin 64 out of engaging relation to the bell-crank lever 73 and finally causes the pin 65 to engage projection 77 of the trip-lever 70, thus disengaging the latter from projection 69. Thereupon the spring 74 throws the lever 73 and the plunger 35 up suddenly to throw tape 78 against ribbon 79 and both against wheel 6, whereby the weight of load on scale-platform is imprinted on tape. Spring 76 instantly retracts the plunger 35 to permit the tape to now travel as hereinafter described.

Following the actuation of the track-lever by the front truck of the car to effect the printing operation last above described, the second truck passes over and again actuates the track-lever to thus turn the cam 58 through another arc of forty-five degrees to thereby return the plunger 60 to the position shown in Fig. 33, thus resetting the bell-crank lever 73, plunger 35 and trip-lever 70, and causing the dog 66 to turn the ratchet 67 and thus move the ribbon 79.

The tape-feeding mechanism described and claimed in the last-mentioned copending application, may be associated with the printing mechanism above described, in which case the trip-lever 80 will be employed to trip the dog 81 (Fig. 39) associated with the cam-disk 82 controlling the movement of the tape 78, said trip-lever or hammer-lever being pivotally mounted on the arm of the bell-crank lever which engages in the plunger 35, and being thrown upwardly to effect its tripping function as said arm strikes the stop 75.

The motor of the tape-feeding mechanism of said copending application is, it will be noted, hand-wound and unless care is exercised to rewind it at proper intervals, the recording mechanism of the scale will be inoperative. The same thing would result, of course, if the tape 70 becomes exhausted or the ribbon 79 is not rewound upon the feed-spool 83. The alarm device hereinbefore referred to, will automatically give notice of the tearing or exhaustion of said tape and, in inserting a new spool of the latter, the operator becomes habituated to rewind the ribbon 79.

It is, therefore, obvious that a motive element actuated from the track-lever is very advantageous and this type of motive element is here provided, as shown in Figs. 47 to 58 inclusive.

Referring first to Fig. 55, it will be seen that tape 79 passes over the plate 84 in a shallow groove therein and is then trained over an idle-roll 85 and then over a polygonal roll 86 equipped with pins 87, and which is rigid with the cam-disk 82. Associated with the latter (Fig. 47) is a dog 88 associated with a rocking-lever 89 mounted on the rock-shaft 90 and held by spring 91 so that the dog bears against the stop pin 92 and is disposed in the path of the teeth of the cam-disk 82. At the free end of said lever 89 is a projection 93 which is disposed in the path of the rollers 94 on the face of a disk 95 rigid with the shaft 44, there being four of said rollers 94 on said disk.

Projecting downwardly from said lever 89 is an arm 96 which engages the roller at the free end of a rocking-lever 97 mounted on the rock-shaft 98. Rigid with the latter are, respectively, an arm 99 and a ratchet-wheel 100.

The arm 99 connects with a constant tension-spring 101 and a partly inactive spring 102 which is placed under tension only during the latter part of the movement of the lever 97 by the arm 96, so that it exerts force to restore the arm 99 to its initial position only during the initial return movement thereof.

Rotatably mounted on the shaft 98 is a large spur-gear 103 which carries a spring-held dog 104 to engage the ratchet 100, the arrangement being such that, as the arm 99 and shaft 98 are returned to their normal positions by the springs 101 and 102, the ratchet will rotate spur-gear 103. The latter meshes with the spur-pinion 105 rigid with the tape take-up spool 106 on shaft 107 which may be manually operated by means of the hand-wheel 108.

It will be noted (Fig. 49) that spring 102 connects at one end with a threaded rod 109 passing freely through an opening in the anchor-member 110 and which is provided with an adjustable collar 111 by means of which the period of activity of the spring 102 relatively to the movement of arm 99 is determined.

A spring-held brake 112 is associated with the spur-gear 103 to prevent its reverse rotation as the dog 104 is retracted and the tension on the tape 79 thus released, thereby preventing slack in said tape and tearing of the same by the sudden tension imposed thereon, following the tensioning of the springs 101 and 102. It also tends to prevent jerk on the tape, due to sudden rebound of the dog 88 and lever 89 as the roller 94 passes out of engagement with the arm 93. The cam-disk 82 sometimes jumps slightly back from direct contact of a tooth with the dog 88, and to avoid this there is provided a flat spring 113 arranged to bear upon the point of another tooth to exert a pressure to turn the disk 82 to effect contact of the first-named tooth with the dog.

It will be noted that the dog 88 cannot engage the periphery of the disk-cam 82, because of the stop-pin 92, and attention is further directed to the fact that said dog is not out of the path of the teeth until the lever 89 has almost completed its stroke under the influence of a roller 94. This occurs after the lever 70 has been tripped so that the tape 79 cannot begin travel until the printing stroke of plunger 35 has been completed. The movement of the lever 89 by a roller 94 occurs simultaneously with the initial movement of the cam 58 which effects tripping of the plunger 35. The arm is normally held by spring 101 in contact with the stop 114.

The tape feeding mechanism includes a speed governor best shown in Fig. 84, and which consists of a fixed band or annulus 173 surrounding the shaft 98. A rod 170 is extended through the shaft 98 and carries a pair of governor members 171 which coact with the inner face of the band 173. Mounted on the rod 170 is a pair of coiled springs 172 and each of which is interposed between the shaft 98 and a governor member 171.

The number of teeth or projections on the cam-disk 82 determines, in connection with the circumference of the roller associated with the same, the length of tape fed after each printing operation and in Figs. 59 and 60, and in Figs. 61 and 62, I have shown modifications of the cam-disk 82 of Figs. 47, 63 and 64, an essential element of each of the rollers being the polygonal form of at least that part of same over which the tape is trained when the roller is idle, the sharp corners thus presented to the tape aiding to prevent slippage and consequent tearing thereof by the pins which pierce it.

Thus, in Figs. 59 and 60, the roller 115 is partly cylindrical and partly square, the single tooth of the cam-disk 116 associated therewith permitting a complete revolution of the roller at each tripping of the dog associated with said cam-disk, and said tooth being located relatively to the roller 115 and the said dog, so that when its tooth is engaged by the dog, the tape will be trained over the flat faces and sharp corners of the roller. In Figs. 61 and 62 the roller 117 is shown to be square and the cam-disk 118 as having two diametrically opposed teeth intended for disposition relatively to the flat faces and sharp corners of the roller and to the dog, to accomplish the same function as is true of the structure shown in Figs. 59 and 60. Guide disks 119 are disposed parallel with the cam-disks to prevent the tape from gradually moving off the rollers, as might occur if the tape is not properly trained over the roller primarily by the operator, said disks 119 serving more particularly as a primary guide element.

In Figs. 77 to 79 inclusive, I have shown a counting device 120 of a very well-known type associated with the plunger 60 of the printing mechanism, for the purpose of indicating the total number of cars weighed during a given period. The spring-held rocking lever 121 of this device is required to swing through a predetermined arc, in order that the device may operate properly, and I have provided very simple adjustable means for operatively associating said device with the plunger 60, consisting of an arm rigidly secured to the rear end of said plunger, said arm including a vertical portion 122 vertically adjustable relatively to said plunger, and a horizontal portion 123 for engaging the rocking-lever 121. As the plunger 60 has a very limited predetermined reciprocating movement, the radial distance between the axis of the lever 121 and the point of its engagement with the portion 123 of said arm, will determine the arc of movement of said lever 121, so that, by the vertical adjustment of said arm the arc of movement of said lever 121 is very accurately adjustable.

It is quite obvious that if the tape 79 should become exhausted or should break, the recording of weights would cease, and it is, therefore, important that notice should be instantly given, in order to obviate the reweighing of cars or, in event of their contents being dumped before the break is discovered, no record whatever of their weight being had.

Figure 4:
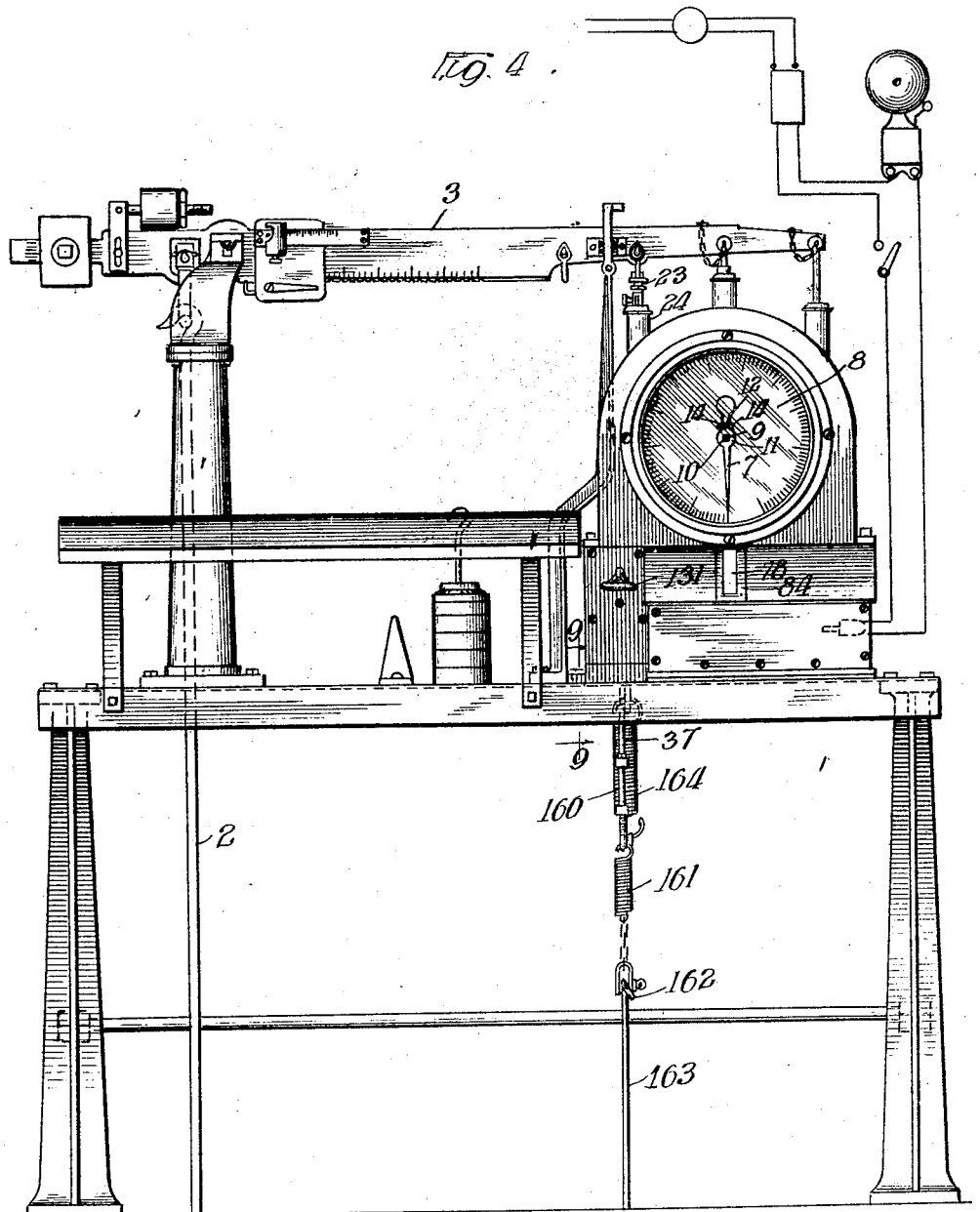
Fig. 4 is a front elevation of the scale-beam and weight indicating dial, etc., associated therewith.

To this end I have provided a very simple and efficient electric alarm device, shown in Figs. 80 to 83 inclusive, which comprises the loosely pivoted lever 124 equipped at its free end with a laterally projecting, relatively heavy arm 125 which is supported upon that portion of the tape stretched between the rollers 85 and 86, said arm 125 being slightly out of vertical alignment with the pivotal axis of said lever 124. The latter may be designated as a bell crank lever as it includes the laterally projecting arm 126, which is adapted to swing into engagement with the spring contact element 127 of the electric switch which includes a companion contact element 128, both said elements being associated with the binding posts 129 and 130, respectively, of an ordinary battery-bell or equivalent electric-alarm circuit, as shown in Fig. 4.

The scale may be interchangeably equipped for automatic operation as above described, or for manual operation. Manual operating means, such as the hand-wheel 108 of the motor, and the hand-wheel 131 on the shaft 44, are necessarily associated with the automatic operating means for use in event of the breaking of a track-lever, or of a cable or spring connecting the rod 37 with the track-lever.

All of that part of the mechanism shown in Figs. 25 to 32 inclusive, as well as the track-lever, are omitted and the mechanism shown in Figs. 65 to 76, inclusive, is substituted.

Where the last-mentioned mechanism is substituted for the automatic, that end of the plunger 60 which opposes the square cam 58, is bifurcated to receive an anti-friction roller 132 (Fig. 71) which is disposed in the angularly arranged cam-slot 133 of a horizontally reciprocable plunger 134, slidable in suitable guides 135 and 136, and provided with stops 137 and 138 coacting with the guide 136 to limit its movements. A tension-spring 139 maintains said plunger 134 normally at the inner limit of its movement. One end of the said plunger projects from the casing for the printing mechanism and is equipped with a handle 140 and a collar 141 inwardly of said handle. Obviously, by pulling on the latter, the plunger will be drawn in the same direction that the tension-spring 74 indirectly associated with the same via the lever 73 and projection 64, tends to move it, thereby effecting the tripping of the printing plunger 35, the release of the said handle serving to reset the printing mechanism, because of the greater power exerted by the spring 139 in connection with the inclined surfaces of the slot 133, than is exerted by the spring 74. The spring 61 may be and is, preferably omitted where said manual operating means are used.

While hand-operation requires only the exercise of power sufficient to overcome the tension of the spring 139, foot operation is preferable and is so provided for as to be selective in connection with hand-operation.

Pivotally mounted between its ends exteriorly of the casing, is a lever 142 having one end disposed between said casing and said collar 141, its lower end being disposed in engagement with a rocking-cam 143 which includes an arcuate surface 144 concentric with the pivot 145, and an inclined surface 146 of gradually decreasing radius which constitutes the active cam surface. The latter terminates at a shoulder constituting the upper surface of a projection 147 with which the upper end of the rod 148 is pivotally connected, the lower end thereof being similarly connected with the foot-lever 149 between the ends of the latter. A loop 150 between the ends of the rod 148 connects with the lower end of the tension-spring 151 which normally supports the foot-lever in its elevated position and holds the projection 147 against the lower end of the lever 142, which thus also constitutes a stop element.

Upon depressing the foot-lever 149, the active cam surface 146 will cause the lower end of the lever 142 to swing inwardly and its upper end to swing outwardly through an arc of substantially the exact length necessary to impart the full stroke required of the plunger 134 to effectively operate the printing mechanism as previously described. The arcuate surface 144 of the cam 143 serves only to retain the lever 142 in the position to which it is moved by the cam-surface 146.

When the last-described mechanism is used (namely that shown in Figs. 69 to 72ª inclusive) that type of motor for effecting travel of the tape 79 is preferably employed, that must be wound up like a clock and is illustrated and described in my aforesaid copending application, Serial No. 681,540, although the type herein illustrated and described may be used and manually operated alternately with the foot-lever 149 or the handle 140, the tape being thus placed under tension preceding each manual operation of the plunger 60. It is, however, preferable, to associate with the plunger 134 means for actuating the motor hereinbefore described and illustrated in Figs. 47 to 58 inclusive, said means being illustrated in Figs. 74 to 76 inclusive.

In Fig. 74, the shaft 90 of the lever 89 (Figs. 47 and 49) is provided with an arm 152 which is normally in the position shown in full lines and, when moved to the position shown in dotted lines, causes the lever 96 to swing the lever 97—98 to thereby place the springs 101 and 102 under tension. It will be noted that in Fig. 74, the spring 139 is disposed above instead of below the plunger 134 and that the latter is provided on its lower face with a projection 153. Disposed in the path of the latter is the upper end of a lever 154 associated with the rock-shaft 155 and a diametrically oppositely extending lever 156 mounted on the other end of said rock-shaft. The free end of lever 156 is connected by link 157 with one end of a lever 158, pivotally supported between its ends on a shaft 159, and having its other end disposed to engage the free end portion of the arm 152, during the latter portion of the rocking movement of said lever 158 upon pulling the handle 140 to actuate the plunger 134. The motor is thus rendered active at the proper moment to effect movement of the tape 79.

Briefly reviewed, the automatic operation of the scale is as follows:

Assuming that a car has just passed over the scale, its rear wheel or wheels, as the case may be, will have set the printing plunger and its trip mechanism in readiness for a printing stroke of the plunger upon the next depression of the track-lever as the front wheel of the next car passes over it.

The springs 101 and 102 will be normally under more or less tension, especially as the tape piles up on the take-up spool, the length of tape fed at each operation being controlled exclusively by the cam-disk 82. Thus, each actuation of the rock-shaft 98 serves only to restore the said springs to maximum tension, and thus occurs only at every second actuation of the track-lever, and solely as the first or front wheel of the car passes over the track-lever. This will be readily understood when it is considered that the shaft 44 is given only one-eighth revolution upon each depression of the track-lever and the disk 95 has only four rollers 94 for engaging and actuating the lever 96. Thus every time the last or rear wheel of the car passes over the track-lever, one of said rollers 94 is brought into engaging relation to the arm 93 and actuates the latter as the front wheel of the next car depresses the track-lever to thus place the springs 101 and 102 under maximum tension. At practically the conclusion of this stroke, the cam-disk 82 is released and travel of the tape occurs.

The tripping of the printing plunger precedes the travel of the tape and is followed by the resetting of said plunger at the same moment that the next roller 94 is brought into engaging relation to the arm 93.

Thus the two mechanisms, viz: the printing plunger actuating mechanism and the tape feeding mechanism, respectively, are set (in so far as their actuating springs are brought to tension) alternately.

A number of details of construction are specifically illustrated without being especially referred to in the specification, illustration being deemed desirable to more thoroughly guide those skilled in the art, in the construction of the scale. Some of these details are important and involve invention and will be now more fully described.

Referring first to Figs. 9 and 10, it will be noted that the rod 37 for actuating the automatic mechanism of Fig. 25, et seq., is equipped with the turnbuckle 160 and is connected below the same with the tension spring 161. This in turn is connected with the loop 162 between the ends of the rod 163, the upper end of the latter being connected with one end of an anchored tension-spring 164 of great strength. The rod 163 is connected with the track-lever and the spring 164 serves to hold the latter in its normal elevated position. The spring 161 serves to cushion the jerk on the rod 37 and on the cam 38 without normally exerting any tension on the rod to react against the spring 40. This constitutes a simple and inexpensive expedient for yieldingly associating the rod 37 with the track-lever with the aforesaid advantage of no reaction against the spring 40 which also provides an easy means of adjustment to obviate lost motion.

Fig. 32 is illustrative of a yielding or cushion stop 165 for the cam 38 as it rebounds after a car wheel has passed over the track-lever.

In Fig. 39, the spring-held element 81 is one end of the trip-lever (for the cam-disk 82) which is used with the type of motor to be wound up like a clock.

Figs. 41 and 42 should be read in connection with Fig. 39 as illustrative of the means for mounting the strip of leather 167 on the printing plunger, said strip being easily replaceable and brought to tension by the plates 168 associated with the bolt 169.

I claim as my invention:

1. A track-scale including a scale beam a printing element associated with the scale-beam for positioning thereby, a printing plunger associated with said element, springs associated with said plunger for projecting the same against said element and partially retracting the same, respectively, trip mechanism associated with said plunger for holding the same in position relatively to the projecting spring to maintain the latter under tension, a track-lever operatively associated with said trip-mechanism for alternately releasing and resetting said plunger, a record-receiving tape adapted for intermittent travel between said printing element and said plunger and mechanism operatively associated with said track-lever and said tape and intermittently released by said trip mechanism for effecting predetermined travel of said tape following each printing stroke of said plunger.

2. A track-scale including a scale beam a printing element associated with the scale-beam for positioning thereby, a printing plunger associated with said element, springs associated with said plunger for projecting the same against said element and partially retracting the same, respectively, trip mechanism associated with said plunger for holding the same in position relatively to the projecting spring to maintain the latter under tension, a track-lever operatively associated with said trip-mechanism for alternately releasing and resetting said plunger, a record-receiving tape adapted for intermittent travel between said printing element and said plunger, and spring-actuated mechanism operatively associated with said track-lever and said tape and intermittently released by said trip mechanism for effecting predetermined travel of said tape following each printing operation.

3. A track-scale including printing means and a traveling tape associated therewith, a spring-actuated motive element for effecting intermittent travel of the tape, a track-lever, and connection between the latter and said motive element for storing up the spring energy of said motive element as said track-lever is actuated.

4. In a track-scale, printing means including a record-receiving tape, mechanism associated with said tape for effecting travel thereof at intervals, a spring for actuating said mechanism, a track-lever, and connection between the latter and said mechanism for setting the latter for actuation by said spring as said lever is depressed.

5. In a track-scale, printing means including a record-receiving tape, mechanism associated with said tape for effecting travel thereof at intervals, a spring for actuating said mechanism, a track-lever, connection between the latter and said mechanism for setting the latter for actuation by said spring as said lever is depressed, trip-means associated with said printing means and said tape-actuating mechanism for maintaining both thereof inactive, and operative connection between said trip-means and said track-lever for permitting operation of said printing means and said mechanism as said track-lever is actuated.

6. In a track-scale, a weight printing mechanism and a record-receiving tape associated therewith, mechanism for effecting travel of said tape at intervals, springs for actuating both said mechanisms, spring-held trip devices associated with both said mechanisms, a track-lever associated with both said mechanisms for setting the same against the action of their springs to thereby permit said trip devices to engage and prevent actuation of said mechanisms, and operative connection between said track-lever and said trip devices for actuating the latter against the action of the springs associated therewith to thereby release said mechanisms for actuation by their respective springs.

7. In a track-scale, a weight printing mechanism and a record-receiving tape associated therewith, mechanism for effecting travel of said tape at intervals, springs for actuating both said mechanisms, spring-held trip devices associated with both said mechanisms, a track-lever associated with both said mechanisms for setting the same against the action of their springs to thereby permit said trip devices to engage and prevent actuation of said mechanisms, and operative connection between said track-lever and said trip devices for actuating the latter against the action of the springs associated therewith to thereby release said mechanisms for actuation by their respective springs, said association and connection between the track-lever and said mechanisms and devices, respectively, including means for synchronizing the aforesaid operations with respect to each other to thereby complete the printing operation before travel of the tape begins.

8. In a track-scale, printing means including a type-carrying element operatively associated with the scale-beam for positioning thereby with respect to a coacting element for effecting printing of the weight of the load on the scale-platform, a record-receiving tape associated with said printing means, a normally latched actuating mechanism for said printing element, a normally latched shifting mechanism for effecting travel of said tape following each actuation of said printing element, a combined releasing and latch setting mechanism for the actuating mechanism for the printing element, said actuating mechanism including means for releasing the shifting mechanism for the tape, and a track-lever operatively associated with both said mechanisms for effecting actuation of the same successively.

9. In a track-scale, a scale beam printing means including a type-carrying element operatively associated with the scale-beam for positioning thereby with respect to a coacting element for effecting printing of the weight of the load on the scale-platform, a record-receiving tape associated with said printing means, a normally latched actuating mechanism for said printing element, a normally latched shifting mechanism for effecting travel of said tape following each actuation of said printing element, trip devices associated with both said mechanisms, the actuating mechanism for said element including means for operating the trip device for the tape shifting mechanism, a track-lever operatively associated with said mechanisms for effecting actuation thereof and operatively associated with said trip devices for controlling the order of operations of said respective mechanisms.

10. In a track-scale, a scale beam printing means including a type-carrying element operatively associated with the scale-beam for positioning thereby with respect to a coacting element for effecting printing of the weight of the load on the scale-platform, a record-receiving tape associated with said printing means, mechanism for actuating said printing element, mechanism for effecting travel of said tape following each actuation of said printing element and controlled by said actuating mechanism, spring-held trip devices associated and normally engaged with said respective mechanisms, a track-lever operatively associated with said mechanisms for effecting actuation thereof and operatively associated with said trip devices for controlling the order of operations of said respective mechanisms.

11. In a track-scale, a scale beam printing means including a type-carrying element operatively associated with the scale-beam for positioning thereby with respect to a coacting element for effecting printing of the weight of the load on the scale-platform, a record-receiving tape associated with said printing means, spring-actuated mechanism for operating said printing element to effect printing on said tape, spring-actuated mechanism for effecting travel of said tape following each actuation of said printing element and controlled by the operating mechanism for the printing element, a track-lever associated with both said mechanisms for positioning them against their actuating springs, and spring-held trip devices associated with said respective mechanisms for normally maintaining them positioned as aforesaid and operatively associated with said track-lever for releasing said mechanisms successively to thereby effect printing on and travel of the tape successively.

12. In a track-scale, printing means including a type-carrying element operatively associated with the scale-beam for positioning thereby with respect to a coacting element for effecting printing of the weight of the load on the scale-platform, a record-receiving tape associated with said printing means mechanism for actuating said printing element, mechanism for effecting travel of said tape following each actuation of said printing element and controlled by the actuating means for the printing element, trip devices associated with both said mechanisms, and mechanism operatively associated with both said mechanisms and said trip devices for effecting operation thereof in predetermined order of succession.

13. In a track-scale, printing means including a type-carrying element operatively associated with the scale-beam for positioning thereby with respect to a coacting element for effecting printing of the weight of the load on the scale-platform, a record-receiving tape associated with said printing means, spring-actuated mechanism for operating said printing element to effect printing on said tape, spring-actuated mechanism for effecting travel of said tape following each actuation of said printing element, and mechanism operatively associated with both said spring-actuated mechanisms for setting the same against the action of their springs and also operatively associated with said trip devices to effect release of said spring-actuated mechanisms successively.

14. A track-scale including weight-printing means comprising a tape shifting mechanism, a printing element, an actuating mechanism for the latter including a releasing means for the tape shifting mechanism, trip-devices for controlling the operations of said mechanisms, and interchangeable means adapted to be respectively associated with said mechanisms for effecting actuation and control thereof, one of said means functioning automatically and the other thereof manually, either of said means capable of being substituted for the other thereof without effecting changes in said mechanisms and trip-devices, and means for normally holding the tape shifting means.

15. A weighing scale including a weight indicating dial, an indicating hand for said dial, a printing-wheel associated with the indicating hand, a rock-shaft common to the indicating hand and type-wheel and operatively associated with the scale-beam for actuation thereby, and means for effecting adjustment of said hand and type-wheel relatively to each other and to said dial to cause the weight indications on the type-wheel, corresponding to the weight indications of said hand on said dial, to become disposed at a predetermined point.

16. In a weighing scale equipped with weight-recording mechanism including a type-wheel, a rigid dial, an indicating hand therefor, a single-shaft common to said hand and said wheel and operatively associated with the scale-beam for rotation thereby, and means for adjusting the positions of said indicating hand and said type-wheel relatively to each other and said dial for causing weight indications on said type-wheel corresponding to weights indicated by said hand on said dial, to become disposed in a predetermined position to effect record of the indicated weight upon actuation of said recording mechanism.

17. In a recording scale equipped with weight-printing means including a type-wheel, a rock-shaft for the latter, a pinion thereon, a rack-bar meshing with said pinion and connected with the scale-beam, a pair of anti-friction idler rollers mounted on stationary supports and bearing against the side faces of said bar, a bodily shiftable anti-friction roller bearing against the rear face of said bar, anti-friction rollers associated with said rack-bar for guiding the same and maintaining it in mesh with said pinion, a slidable carriage for said roller-bearing against the rear face of said bar, an adjusting screw associated with and positioned in the path of the carriage, and guides for the latter.

18. In a track-scale equipped with weight-recording mechanism including a record-receiving tape, a motor for effecting travel of said tape at intervals, a spring for actuating said motor, and a track-lever operatively associated with said spring for storing up energy therein for actuating said motor to effect said travel of said tape, an idle-roll associated with said tape, and trip-means associated with said idle-roll and said track-lever for control by the latter.

19. A track-scale including a printing-element associated with the scale-beam for positioning thereby, a printing plunger associated with said element, springs associated with said plunger for projecting the same against said element and partially retracting the same, respectively, trip-mechanism associated with said plunger for holding the same in position relatively to the projecting spring to maintain the latter under tension, a track-lever operatively associated with said trip-mechanism for alternately releasing and resetting said plunger, a record-receiving tape adapted for intermittent travel between said printing-element and said plunger, an idle-roll associated with said tape, trip-mechanism associated with said idle-roll for preventing travel of said tape, and operative connection between said trip-mechanism and said track-lever for effecting release of said idle-roll following the storing up of energy in said motor spring.

20. In a track-scale equipped with weight-recording mechanism including a record-receiving tape, a motor for effecting travel of said tape at intervals, a spring for actuating said motor, an idle-roll associated with said tape, trip-mechanism associated with said idle-roll for preventing travel of said tape, a single lever for effecting the storing up of motor-spring energy and release of said idle-roll, and a track-lever operatively associated with said lever for actuating the same.

21. In a track-scale equipped with weight-recording mechanism including a record-receiving tape, a printing plunger, a motor for effecting travel of said tape at intervals, a spring for actuating said motor, a track lever, and mechanism operatively associated with said track-lever and said tape for effecting predetermined travel of the latter following each printing stroke of said plunger, an idle-roll associated with said tape, trip-mechanism associated with said idle-roll for preventing travel of said tape, a single spring-held lever for effecting the storing up of motor-spring energy and release of said idle-roll, and a track-lever operatively associated with said lever for actuating the same against the action of its spring.

22. In a track-scale equipped with weight-recording mechanism including a record-receiving tape, a motor for effecting travel of said tape at intervals, a spring for actuating said motor, and a track-lever operatively associated with said spring for storing up energy therein for actuating said motor to effect said travel of said tape, and a brake associated with said motor to retard the same and prevent slack in the tape following the travel of same.

23. In a track-scale equipped with weight-recording means including a record-receiving tape, a spring-actuated motor for effecting travel of said tape, printing means including a spring-actuated motive element, spring-held trip devices operatively associated with said motor and said motive element, respectively, a track-lever, and mechanism associated with and actuated by said track-lever and including two simultaneously rotatable elements operatively associated with said motor and motive element, respectively, for setting the same for actuation by their springs and also operatively associated with said trip devices for actuating the latter against their springs to thereby effect tripping and actuation of said motor and motive element.

24. In a track-scale equipped with weight-recording means including a record-receiving tape, a spring-actuated motor for effecting travel of said tape, printing means including a spring-actuated motive element, spring-held trip devices operatively associated with said motor and said motive element, respectively, a track-lever, and mechanism associated with and actuated by said track-lever and including two simultaneously rotatable elements operatively associated with said motor and motive element, respectively, for setting the same for actuation by their springs, and also operatively associated with said trip devices for actuating the latter against their springs to thereby effect tripping and actuation of said motor and motive element, at respectively different intervals.

25. In a track-scale equipped with weight-recording means including a record-receiving tape, a spring-actuated motor for effecting travel of said tape, printing means including a spring-actuated motive element, spring-held trip devices operatively associated with said motor and said motive element, respectively, a track-lever, and mechanism associated with and actuated by said track-lever and including two simultaneously rotatable elements operatively associated with said motor and motive element, respectively, for setting the same for actuation by their springs, and also operatively associated with said trip devices for actuating the latter against their springs to thereby effect tripping and actuation of said motor and motive element, at respectively different intervals, and alternately with respect to said trip devices.

26. In a recording track-scale, a tape-feed motor, a spring for actuating the same, a tape connected therewith, an idle-roll over which the tape is trained, a trip-mechanism associated with said idle-roll to prevent movement of said tape and motor, a printing-mechanism associated with the tape and including a spring-actuated motive element and a spring-held trip device associated therewith, a track-lever, a mechanism adapted to be actuated thereby and including two rotatable members, one thereof associated with said printing-mechanism and its trip device to release the latter as one car-wheel passes over the track-lever, to thereby effect a printing impulse and to reset said mechanism and its trip device as the second car-wheel passes over said lever, the other rotatable member associated with the tape-feed motor and said trip-mechanism for storing up energy in the motor-spring and then tripping said trip-mechanism to effect travel of the tape as the first wheel of the car passes over said lever, said last-named rotatable member out of engaging relation to said motor and trip-mechanism as the second car-wheel passes over the track-lever.

27. In a recording track-scale, the combination with printing and tape-feeding mechanisms, of a track-scale, and a mechanism associated therewith for controlling the operations of said printing and tape-feeding mechanisms, said mechanism including a shaft, a ratchet-wheel thereon, a dog associated therewith, a rocking-cam connected with said track-lever and said dog for imparting to the latter a predetermined movement, to thereby rotate said shaft through a given arc, means controlled by said cam for limiting said rotation of said shaft independently of said dog, a rotatable cam rigid with said shaft and operatively associated with the printing-mechanism for effecting actuation thereof at intervals, and a rotatable element rigid with said shaft and operatively associated with the tape-feeding mechanism to effect actuation thereof at intervals.

28. In a recording track-scale, the combination with printing and tape-feeding mechanisms, of a track-scale, and a mechanism associated therewith for controlling the operations of said printing and tape-feeding mechanisms, said mechanism including a shaft, a ratchet-wheel thereon, a dog associated therewith, a rocking-cam having an active surface portion for imparting predetermined movement to said dog, and an arcuate surface concentric with its pivotal axis for preventing reverse movement of said dog following the impulse imparted thereto by the active surface portion, said arcuate surface portion of said cam also permitting swing of said rocking-cam, cam-lever and said track-lever through arcs, respectively, longer than required to actuate said dog, and means on said shaft associated with said printing-mechanism and tape-feeding mechanism, respectively, to effect actuation thereof at intervals.

29. In a recording track-scale, the combination with printing and tape-feeding mechanisms, of a track-lever, and a mechanism associated therewith for controlling the operations of said printing and tape-feeding mechanisms, said mechanism including a shaft, a ratchet-wheel thereon, a dog associated therewith, a rocking-cam having an active surface portion for imparting predetermined movement to said dog and an arcuate surface concentric with its pivotal axis for preventing reverse movement of said dog following the impulse imparted thereto by the active surface portion, said arcuate surface portion of said cam also permitting swing of said cam-lever and said track-lever through arcs, respectively, longer than required to actuate said dog, a second ratchet-wheel opposed to the first-mentioned a spring-held dog associated and maintained normally out of engagement therewith by said rocking-cam and passing into engaging relation thereto as said dog completes the movement imparted thereto by said active cam surface, and means on said shaft associated with said printing-mechanism and tape-feeding mechanism, respectively, to effect actuation thereof at intervals.

30. In a spring scale, a scale beam, a helical tension spring, a connecting device between one end of the spring and said beam and provided intermediate its ends with a pair of inter-engaging threaded elements adjustable relatively to each other, a tubular block extending into the other end of the spring and provided with means for connecting thereto a plurality of the coils of the spring, a threaded rod extending into and rigidly fixed to the block, and a stop nut carried by the rod.

GEORGE G. WILEY.